United States Patent
Cui et al.

(10) Patent No.: US 12,423,239 B2
(45) Date of Patent: Sep. 23, 2025

(54) CACHE MANAGEMENT METHOD, APPARATUS AND SYSTEM, DEVICE AND MEDIUM

(71) Applicant: SUZHOU METABRAIN INTELLIGENT TECHNOLOGY CO., LTD., Jiangsu (CN)

(72) Inventors: Jian Cui, Jiangsu (CN); Jiang Wang, Jiangsu (CN); Shuqing Li, Jiangsu (CN); Xingyuan Li, Jiangsu (CN); Xingang Ju, Jiangsu (CN); Ruizhen Wu, Jiangsu (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/724,392

(22) PCT Filed: Jan. 12, 2023

(86) PCT No.: PCT/CN2023/071904
§ 371 (c)(1),
(2) Date: Jun. 26, 2024

(87) PCT Pub. No.: WO2024/016617
PCT Pub. Date: Jan. 25, 2024

(65) Prior Publication Data
US 2024/0419601 A1    Dec. 19, 2024

(30) Foreign Application Priority Data

Jul. 21, 2022    (CN) .......................... 202210856082.4

(51) Int. Cl.
*G06F 12/0842*    (2016.01)
*G06F 11/07*    (2006.01)
*G06F 12/0871*    (2016.01)

(52) U.S. Cl.
CPC ...... *G06F 12/0842* (2013.01); *G06F 11/0772* (2013.01); *G06F 12/0871* (2013.01)

(58) Field of Classification Search
CPC ............. G06F 12/0842; G06F 12/0871; G06F 11/0772
See application file for complete search history.

(56) References Cited

U.S. PATENT DOCUMENTS 6,263,302 B1    7/2001    Hellestrand et al.
9,519,486 B1 *    12/2016    Blott ................... G06F 15/7867
(Continued)

FOREIGN PATENT DOCUMENTS

CN    104536911 A    4/2015
CN    105453056 A    3/2016
(Continued)

OTHER PUBLICATIONS

International Search Report and Written Opinion received for PCT Serial No. PCT/CN2023/071904, Apr. 28, 2023.
(Continued)

*Primary Examiner* — Gary W. Cygiel
(74) *Attorney, Agent, or Firm* — Merchant & Gould P.C.

(57) ABSTRACT

A cache management method, apparatus and system, a device, and a nonvolatile readable storage medium. The method includes: receiving, by a storage system cache manager, a target operation request sent by a target user; processing the target operation request in a pipeline manner, so as to execute a processing operation corresponding to the target operation request on a cache line using the target operation request; and feeding back a processing result of the target operation request to the target user, and executing a cache maintenance operation corresponding to the processing result according to the processing result by means of a software cache manager.

20 Claims, 14 Drawing Sheets

(56) References Cited

U.S. PATENT DOCUMENTS

| | | | |
|---|---|---|---|
| 2007/0180195 A1* | 8/2007 | McBride | G06F 12/1027 |
| | | | 711/202 |
| 2008/0209127 A1 | 8/2008 | Brokenshire et al. | |
| 2018/0285275 A1 | 10/2018 | Barczak et al. | |
| 2019/0286563 A1 | 9/2019 | Swamy et al. | |
| 2020/0081840 A1 | 3/2020 | Kaushikkar et al. | |
| 2020/0192805 A1 | 6/2020 | Keymolen | |

FOREIGN PATENT DOCUMENTS

| | | |
|---|---|---|
| CN | 110147254 A | 8/2019 |
| CN | 110688160 A | 1/2020 |
| CN | 113032293 A | 6/2021 |
| CN | 114924999 A | 8/2022 |

OTHER PUBLICATIONS

Chinese Search Report—1 received for CN Serial No. 2022108560824, 2 pgs.

Chinese Search Report—2 for CN Serial No. 2022108560824, Sep. 5, 2022, 2 pgs.

Song, H.G. "Parallel multi-source video processing based on software pipeline", Video engineering, 2021, 41 (6); pp. 133-137.

Li et al., "Design of a 2 GHz L2 Cache for 16-core Processor", J. of Shanghai Jiao Tong Univ., vol. 47, No. 1, Jan. 2013.

Huang et al., "Architecture Supported Synchronization-Based Cache Coherence Protocol for Many-Core Processors", Chinese J. of Computers, vol. 32, No. 8, Aug. 2009.

\* cited by examiner

| Requester = {user_type, user_id} | Request Seq |
|---|---|
| Key = {device_id, lba} ||
| Action= alloc (allocate memory)/free/check/lock/unlock/set ||

Fig. 4a

| Requester = {user_type, user_id} | Request Seq |
|---|---|
| Key= {device_id, lba} ||
| Action = alloc/free/check/lock/unlock/set ||
| SW Hash value ||
| Type = Response/Event ||
| Result = Ok/Fail ||
| Status = {Invalid/modified, miss, Col,Quota, locked/unlocked} ||
| Response/Event Data Length ||
| Response/Event Data ||

Fig. 4b

| Request | Response |
|---|---|
| Alloc (Allocate memory) | OK, Invalid,*<br>Fail,Invalid/modified,*<br>Fail, collision,*<br>Fail, quota,* |
| Free | OK, Invalid, unlocked, *<br>Fail, miss, *<br>Fail, locked, *<br>Fail, modified, * |
| Check | OK, *<br>Fail, miss |
| Lock | OK, *, locked (lock success)<br>Fail, miss<br>Fail, locked (CL has been in a locked state, cannot be locked again) |
| Unlock | OK,Invalid/modified, unlocked, *<br>Fail, miss, * |
| Set State Invalid | OK, Invalid, *<br>Fail, miss, * |
| Set State Modified | OK, Modified, *<br>Fail, miss, * |

Fig. 5

| Alloc/Free | Update LK | Update CL | Update Quota | Update CPL | Response |
| --- | --- | --- | --- | --- | --- |
| Lock/unlock | nop | Update CL | nop | Update CPL | Response |
| Set | nop | Update CL | nop | Update CPL | Response |
| Fail | nop | nop | nop | Update CPL | Response |
| Check | nop | nop | nop | Update CPL | Response |
Fig. 13b
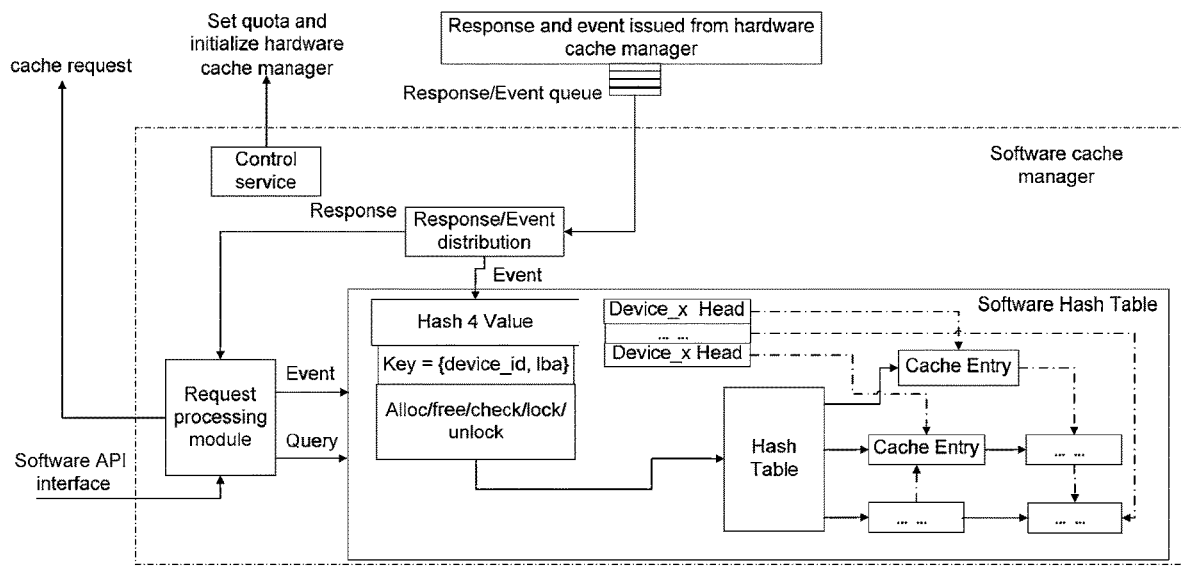
Fig. 14
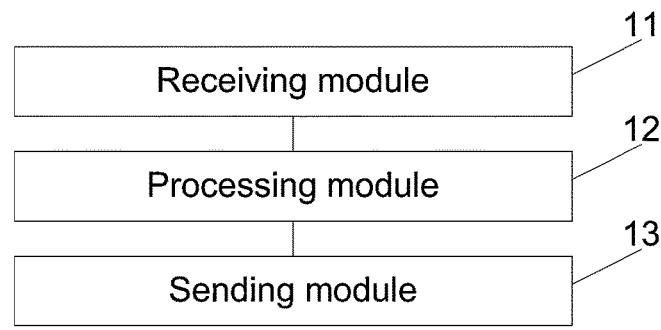
Fig. 15

CACHE MANAGEMENT METHOD, APPARATUS AND SYSTEM, DEVICE AND MEDIUM

CROSS-REFERENCE TO RELATED APPLICATION

The present disclosure is a National Stage Filing of the PCT International Application No. PCT/CN2023/071904 filed Jan. 12, 2023, which claims priority to Chinese patent application no. 202210856082.4, filed with the China National Intellectual Property Administration on Jul. 21, 2022 and entitled "cache Management Method, Apparatus and System, Device and Medium", which is incorporated herein by reference in its entirety.

TECHNICAL FIELD

The present disclosure relates to the technical field of cache management, and in particular, to a cache management method, apparatus and system, a device and a nonvolatile readable storage medium.

BACKGROUND

In a computer system, a cache is a memory for storing a small amount of temporary data that needs to be accessed quickly, for example, a common Central Processing Component (CPU) cache located between a CPU and a main memory. In an external storage system, a magnetic disk or a solid state disk has different access delays due to the physical characteristics of its storage medium. This delay is typically much greater than the access delay of the main memory. To accelerate an access speed of external storage, a Dynamic Random Access Memory (DRAM) is generally used on a magnetic disk or a solid state disk as an on-disk data cache. For a storage acceleration card located between a magnetic disk, a solid state disk and a host CPU, such as a device like Redundant Arrays of Independent Disks (Raid) card, a cache is also required to improve the performance of the entire storage system.

How to reduce a delay of a cache operation and improve the real-time performance of cache management is a problem that needs to be solved by a person skilled in the art.

SUMMARY

The embodiments of the present disclosure provide a cache management method, apparatus and system, a device and a nonvolatile readable storage medium.

The embodiments of the present disclosure provide a cache management method. The cache management method is applied to a storage system cache manager. The cache management method includes:
  a target operation request sent by a target user is received;
  the target operation request is processed in a pipeline manner, so as to execute a processing operation corresponding to the target operation request on a cache line using the target operation request; and
  a processing result of the target operation request is fed back to the target user, and a cache maintenance operation corresponding to the processing result is executed according to the processing result by means of a software cache manager.

In some embodiments, the processing operation corresponding to the target operation request is executed on the cache line using the target operation request includes:
  a target hash value is calculated according to a key value in the target operation request;
  table lookup is performed in a target data table using the target hash value;
  if no target address corresponding to the target hash value is found, a first query result is outputted; if the target address is found, retrieval is performed in a cache entry table corresponding to the target address according to the target address, and a retrieved key value is compared with the key value of the target operation request to output a second query result; and
  a processing operation is executed according to the target operation request and one of the first query result and the second query result.

In some embodiments, before the target hash value is calculated according to the key value in the target operation request, the method further includes:
  priority ranking is performed on target operation requests using an arbitration rule.

In some embodiments, after priority ranking is performed on the target operation requests using the arbitration rule, the method further includes:
  if the target operation request is an allocation request, whether the allocation request exceeds a remaining quota is determined;
  if the allocation request does not exceed the remaining quota, it is continued to execute calculating the target hash value according to the key value in the target operation request; and if the allocation request exceeds the remaining quota, the target operation request is processed according to an over-quota configuration mode.

In some embodiments, whether the allocation request exceeds the remaining quota is determined includes:
  a key value of the allocation request is determined;
  a cache count corresponding to the key value of the allocation request is determined according to the key value of the allocation request;
  whether a cache count incremented by 1 is greater than a corresponding first threshold is determined;
  if the cache count incremented by 1 is greater than the corresponding first threshold, it is determined that the allocation request exceeds the remaining quota; and if the cache count incremented by 1 is less than or equal to the corresponding first threshold, whether a global count after the cache count is incremented by 1 is greater than a corresponding second threshold is determined;
  if the global count after the cache count is incremented by 1 is greater than the corresponding second threshold, it is determined that the allocation request exceeds the remaining quota; and if the global count after the cache count is incremented by 1 is not greater than the corresponding second threshold, it is determined that the allocation request does not exceed the remaining quota.

In some embodiments, the target operation request is processed according to the over-quota configuration mode includes:
  if the over-quota configuration mode is a warning mode, it is continued to calculate the target hash value according to the key value in the target operation request, and corresponding event information is generated and sent to the software cache manager; and
  if the over-quota configuration mode is a blocking mode, a processing result indicating processing failure is directly generated.

In some embodiments, after the processing result indicating processing failure is directly generated, the method further includes:

if the target operation request is an operation request initiated by a software cache user, response information is reported to the software cache manager, and the target user includes the software cache user; and if the target operation request is an operation request initiated by a hardware cache user, response information is reported to a hardware cache user, and event information is copied and reported to the software cache manager, and the target user includes the hardware cache user.

In some embodiments, the target hash value is calculated according to the key value in the target operation request and table lookup is performed in the target data table using the target hash value include: the target hash value corresponding to the key value in each target operation request is calculated according to the key value in each target operation request, and the target operation request and the target hash value corresponding to the target operation request are stored into a first target queue;

the target hash value of the target operation request for which table lookup is not performed is acquired from the first target queue, and table lookup is performed in the target data table according to the acquired target hash value;

the target operation request for which table lookup has been performed and the target hash value corresponding to the target operation request for which table lookup has been performed are deleted from the first target queue, and are added to a second target queue; and if notification information indicating that the target operation request has been processed is received, the target operation request and the target hash value corresponding to the notification information are deleted from the second target queue.

In some embodiments, the target hash value corresponding to the key value in each target operation request is calculated according to the key value in each target operation request includes:

the key value in the target operation request is sequentially sent to three hash function calculation modules for calculation, so as to obtain the target hash value, and the target hash value includes row, sig and CAM val.

In some embodiments, after the target hash value corresponding to the key value in each target operation request is calculated according to the key value in each target operation request, the method further includes:

whether the target hash value collides with a hash value of an operation request in a third target queue is determined, and the third target queue includes the first target queue and the second target queue;

if the target hash value does not collide with the hash value of the operation request in the third target queue, it is continued to execute storing the target operation request and the target hash value corresponding to the target operation request into the first target queue;

if the target hash value collides with the hash value of the operation request in the third target queue, the target operation request and the target hash value corresponding to the target operation request are stored into the first target queue is suspended; and if it is detected that no hash value colliding with the target hash value exists in the third target queue, it is continued to execute storing the target operation request and the target hash value corresponding to the target operation request into the first target queue.

In some embodiments, whether the target hash value collides with the hash value of the operation request in the third target queue is determined includes:

if the target hash value is the same as the hash value of the operation request in the third target queue, it is determined that the target hash value collides with the hash value of the operation request in the third target queue; and if the target hash value is different from the hash value of the operation request in the third target queue, it is determined that the target hash value does not collide with the hash value of the operation request in the third target queue.

In some embodiments, the target operation request is any one of the following requests: an allocation request, a release request, a check request, a lock request, an unlock request, and a set request.

In some embodiments, the target operation request sent by the target user is received includes:

the target operation request sent by a hardware cache user or the target operation request sent by a software cache user by means of the software cache manager is received.

In some embodiments, the processing result of the target operation request is fed back to the target user, and the cache maintenance operation corresponding to the processing result is executed according to the processing result by means of the software cache manager include:

if the target operation request is a request sent by the hardware cache user, response information of the target operation request is sent to the hardware cache user, and event information corresponding to the response information is generated and sent to the software cache manager, such that the software cache manager executes a cache maintenance operation corresponding to the event information according to the event information; and if the target operation request is a request sent by the software cache user, response information of the target operation request is sent to the software cache user, such that the software cache manager executes a cache maintenance operation corresponding to the response information according to the response information.

In some embodiments, the event information corresponding to the response information is generated and sent to the software cache manager includes:

the software cache manager is asynchronously notified of the event information by means of event reporting, and the event information includes information about behaviors such as cache allocation, usage and query.

The embodiments of the present disclosure provide a cache management apparatus. The cache management apparatus is applied to a storage system cache manager. The cache management apparatus includes:

a receiving module, configured to receive a target operation request sent by a target user;

a processing module, configured to process the target operation request in a pipeline manner, so as to execute a processing operation corresponding to the target operation request on a cache line using the target operation request; and a sending module, configured to feed back a processing result of the target operation request to the target user, and execute a cache maintenance operation corresponding to the processing result according to the processing result by means of a software cache manager.

In some embodiments, the processing module includes:
a table lookup component, configured to calculate a target hash value according to a key value in the target operation request, and perform table lookup in a target data table using the target hash value;
an output component, configured to, if no target address corresponding to the target hash value is found, output a first query result; and if the target address is found, perform retrieval in a cache entry table corresponding to the target address according to the target address, and compare a retrieved key value with the key value of the target operation request to output a second query result; and
a first processing component, configured to execute a processing operation according to the target operation request and one of the first query result and the second query result.

The embodiments of the present disclosure provide a cache management system, including:
a storage system cache manager, configured to receive a target operation request sent by a target user, process the target operation request in a pipeline manner, so as to execute a processing operation corresponding to the target operation request on a cache line using the target operation request, and feed back a processing result of the target operation request to the target user; and
a software cache manager, configured to execute a cache maintenance operation corresponding to the processing result according to the processing result.

The embodiments of the present disclosure provide an electronic device, including:
a memory, configured to store a computer program; and
a processor, configured to implement the steps of the cache management method when executing the computer program.

The embodiments of the present disclosure provide a computer nonvolatile readable storage medium, and the computer nonvolatile readable storage medium stores a computer program which, when executed by a processor, implement the steps of the cache management method.

Also disclosed are a cache management apparatus and system, a device and a nonvolatile readable storage medium.

BRIEF DESCRIPTION OF THE DRAWINGS

To describe the technical solutions in the embodiments of the present disclosure or in the prior art more clearly, the following briefly introduces the drawings required for description in the embodiments or the prior art. Apparently, the drawings in the following description show merely some embodiments of the present disclosure, and a person of ordinary skill in the art may still derive other drawings from these drawings without inventive efforts.

FIG. 4a is a diagram of format definition of an operation request disclosed in an embodiment of the present disclosure;
FIG. 4b is a diagram of format definition of a processing result disclosed in an embodiment of the present disclosure;
FIG. 5 is a schematic diagram of a correlation between an operation request and response information disclosed in an embodiment of the present disclosure;
FIG. 13b is another schematic diagram of processing an operation request in a pipeline manner disclosed in an embodiment of the present disclosure;
FIG. 14 is a schematic structural diagram of a software cache manager disclosed in an embodiment of the present disclosure;
FIG. 15 is a schematic structural diagram of a cache management apparatus disclosed in an embodiment of the present disclosure.

DETAILED DESCRIPTION OF THE EMBODIMENTS

In practice, a cache management system of external storage generally needs to support at least the following functions:
1. application and release of a cache entry and a cache line, and the cache line is a cache line and is a basic component of a cache operation; the cache entry refers in particular to a node managing the cache line in a cache system, and corresponds to the cache line on a one-to-one basis and points to the cache line;
2. mapping from the cache entry to the cache line;
3. cache hit/miss determination, and cache Hit is a cache hit, indicating that data to be operated is found in the cache during a certain access; and cache Miss is a cache miss, indicating that data to be operated is not found in the cache during a certain access; and
4. ensuring the consistency between the cache line and external storage data.

Figure 1:
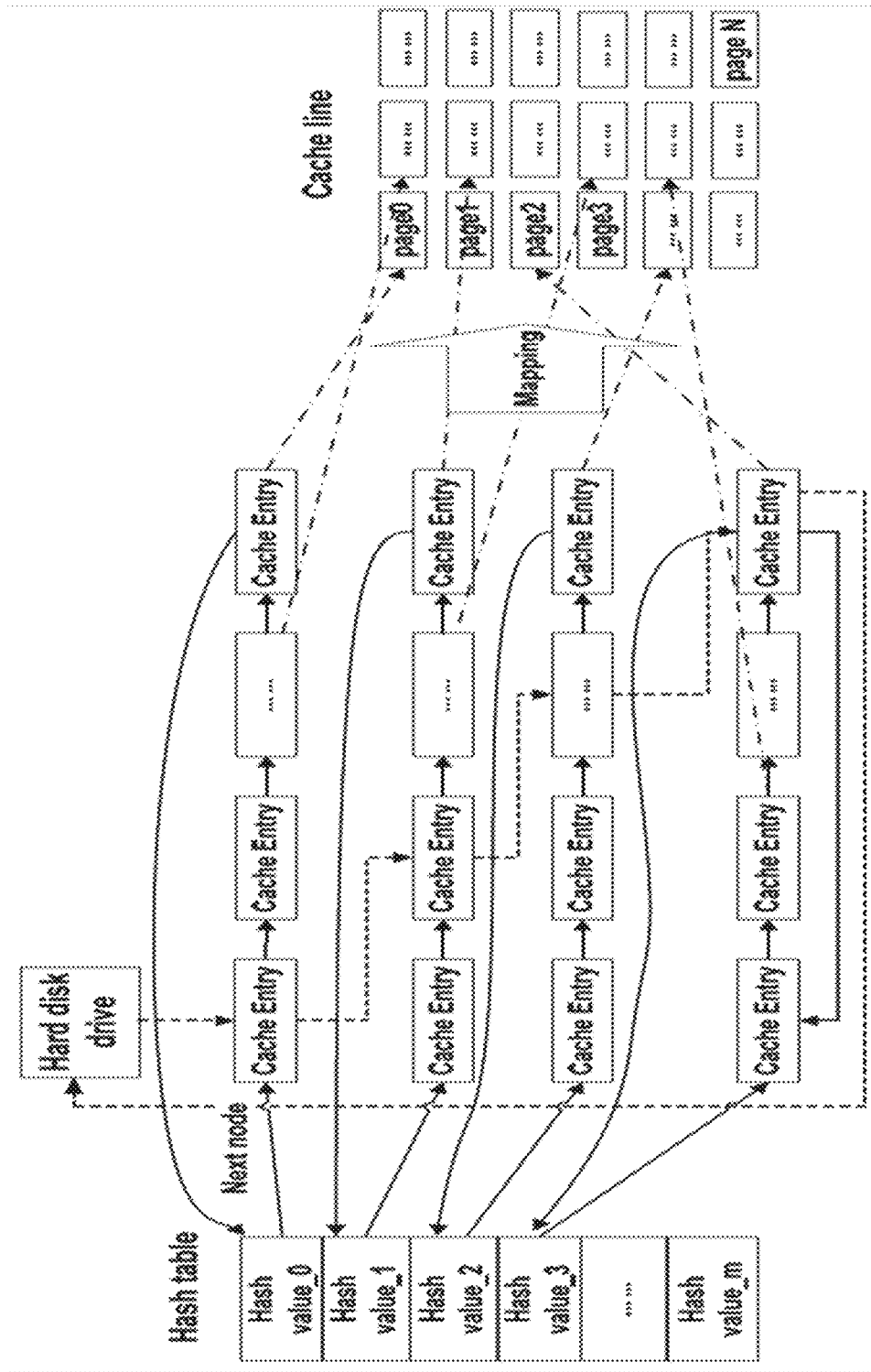
FIG. 1 is a schematic diagram of a hash table.

In an external storage system, a cache management system implemented based on CPU software is relatively common. cache Entries are generally organized and stored in the form of a hash table. FIG. 1 is a schematic diagram of hash representation. As shown in FIG. 1, a plurality of cache Entries are stored in a Hash Table, and cache Entries with the same Hash value (a hash, converting input data (key) of any length into an output of a fixed length by means of a hash algorithm, which is a contraction mapping) are stored in a same bidirectional linked list. While cache Entries belonging to the same storage medium (e.g., hard disk drive HDD_0 or Logic Drive 0) are linked using another bidirectional linked list (dotted line). Each cache Entry in the hash table points to one cache line.

However, the solution has the following main disadvantages:
1. Cache management handled by software, including allocation, release, and cache hit/miss detection, often requires traversing a linked list, resulting in long time consumption and delay jitter, and therefore the real-time performance cannot be ensured.
2. When a plurality of cache accessors perform cache operations, the cache operations often need to be performed in series by software using a mechanism such as mutual exclusion lock, and a plurality of requests need to wait in a queue because a protected critical section consumes a long time, affecting a throughput rate, and therefore the performance of a CPU single core becomes a bottleneck of the system performance.

At present, a cache in an external storage device may bring the following advantages to a storage system:
1. When the host writes data into an external storage system, the data may be written into the cache for temporary storage first, and "write success" is immediately returned to the host, thereby reducing an access delay.
2. Data that needs to be written into a storage medium may be arranged in the cache in a manner of being more friendly to the storage medium, and written in batches, thereby improving a throughput rate.
3. When the host reads data, the read data is directly returned from the cache in the case of cache hit, thereby reducing an access delay. Furthermore, the cache system may further selectively pre-read data to be accessed from the storage medium according to the characteristics of data to be read, and put the data into the cache, thereby improving the probability of cache hit.
4. The cache system divides data into cold and hot data according to the characteristics of data accessed by the host. Hot data that is frequently accessed is retained in the cache, while cold data that is rarely used is offloaded to the disk, thereby improving the utilization efficiency of the cache.

In an external storage system, a cache management system implemented based on CPU software is relatively common. The solution has the following advantages: software does not limit the length of a linked list, allowing for high flexibility; cache entries may be dynamically allocated, providing a high utilization rate, and a cold-hot relationship of the cache Entries may be represented by positions in the linked list. However, the cache management manner implemented by CPU software has problems such as long operation time consumption, incapability of ensuring the real-time performance, and affecting a throughput rate.

Therefore, the present disclosure provides a cache management method, apparatus and system, a device and a nonvolatile readable storage medium, so as to reduce a delay of a cache operation and improve the real-time performance of cache management.

The following clearly and completely describes the technical solutions in the embodiments of the present disclosure with reference to the drawings in the embodiments of the present disclosure. Apparently, the described embodiments are merely some rather than all of the embodiments of the present disclosure. All other embodiments obtained by a person of ordinary skill in the art based on the embodiments of the present disclosure without inventive efforts shall belong to the scope of protection of the present disclosure.

Figure 2:
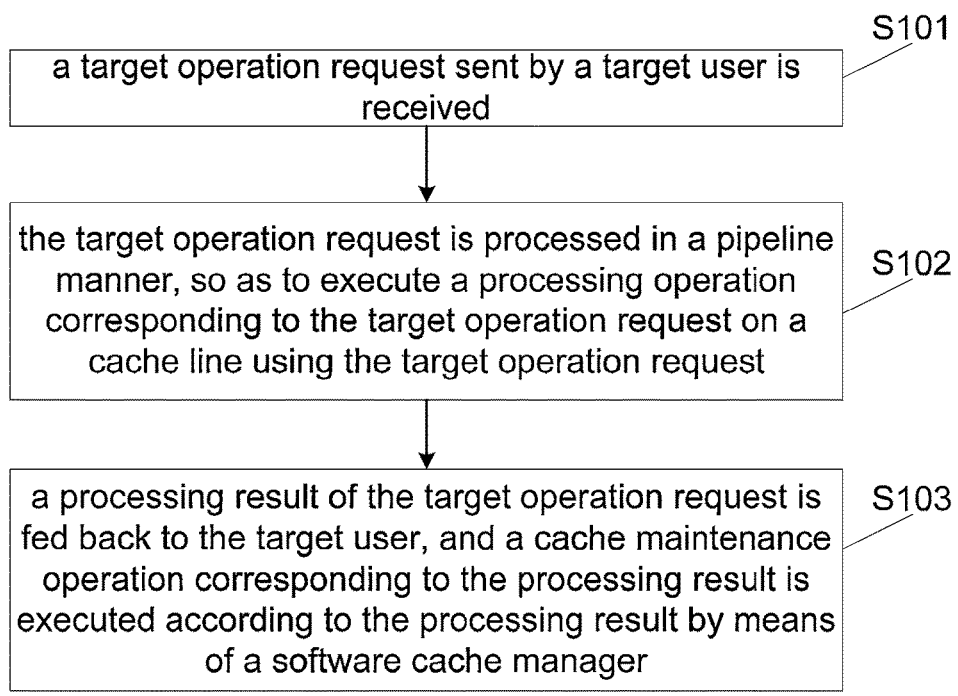
FIG. 2 is a schematic flowchart of a cache management method disclosed in an embodiment of the present disclosure.

FIG. 2 is a schematic flowchart of a cache management method provided in an embodiment of the present disclosure. The cache management method is applied to a storage system cache manager. The cache management method includes the following steps:

S101: a target operation request sent by a target user is received.

In this embodiment, a cache is managed mainly by two parts, i.e. a storage system cache manager and a software cache manager. In this embodiment, the cache memory is a cache. The storage system cache manager may be understood as a hardware cache manager, and is mainly responsible for tasks having a high requirement for real-time performance and relatively simple logic, for example, processing operations performed on cache lines, including cache allocation and release, and cache hit/miss query, etc. The software cache manager is a software cache manager, and mainly processes cache maintenance operations having a relatively low requirement for real-time performance but complex logic, for example, maintenance of cold and hot data and implementation of a cache offload policy, etc.

Figure 3:
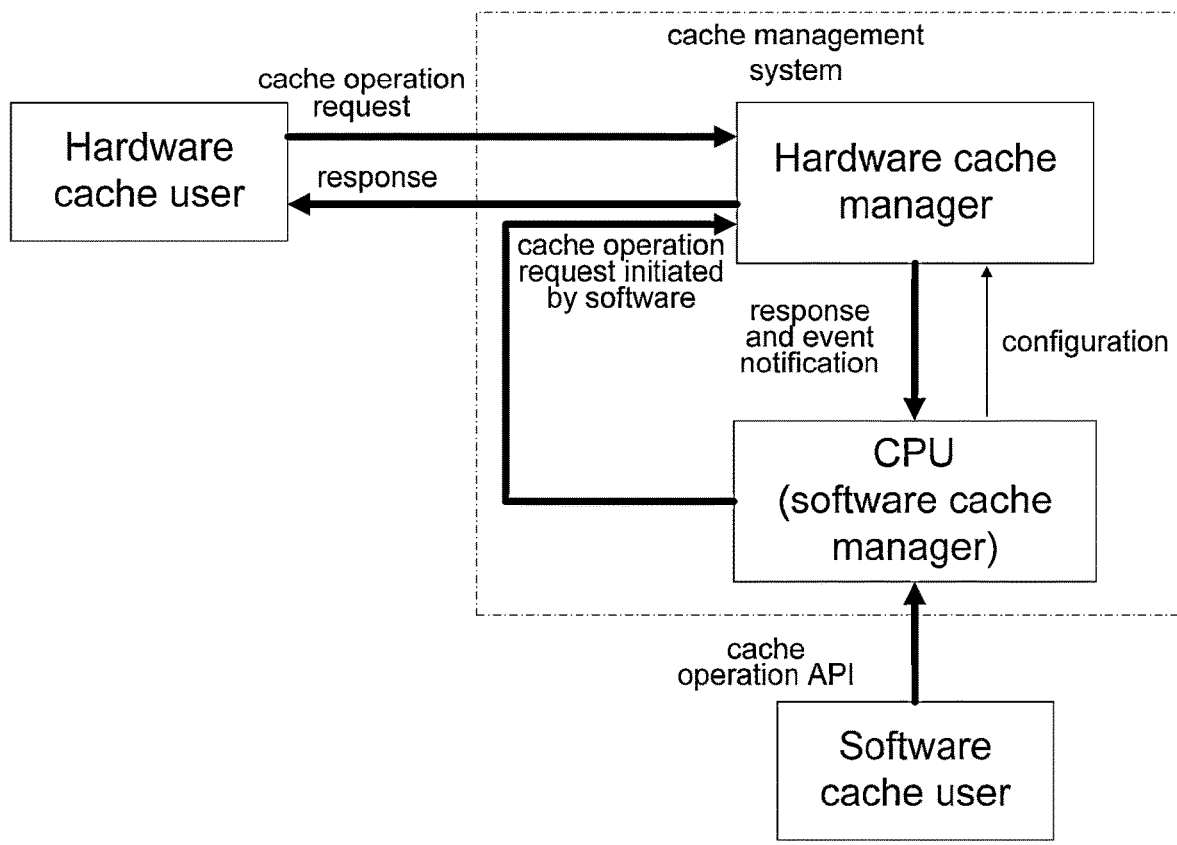
FIG. 3 is a schematic structural diagram of a cache management system disclosed in an embodiment of the present disclosure.

FIG. 3 is a schematic structural diagram of a cache management system disclosed in an embodiment of the present disclosure. The cache management system includes a hardware cache manager and a software cache manager, and the hardware cache manager is configured to receive a target operation request sent by a hardware cache user or a target operation request sent by a software cache user by means of a software cache manager, and the hardware cache user is a hardware cache user and is an external hardware module capable of initiating a cache service request, and the software cache user is a software cache user and is an external software module capable of initiating a cache service request. The hardware cache manager provides signals or register interfaces for requesting and responding for the hardware cache user and the software cache manager respectively, and initiates a request and receives a response according to a format defined by a cache management system. The software cache manager provides a cache operation Application Programming Interface (API) for a software cache user, and an operation request initiated by the software cache user is sent to the hardware cache manager by means of the software cache manager.

It should be noted that, the cache requests sent by the hardware cache user or the software cache user and received by the hardware cache manager are all operation requests. In this embodiment, the operation request currently received by the hardware cache manager is referred to as a target operation request. Furthermore, the cache management system establishes an index for a cache line using device_id, which is a drive device number, and Logical Block Addressing (Iba), and only the cache line with a fixed size is supported. Device represents a logical or physical storage device. FIG. 4a is a diagram of format definition of an operation request disclosed in an embodiment of the present disclosure. In FIG. 4a, each field is defined as follows:

Requester: identifying a request initiator, including User_type and User_id;

User_type: used for distinguishing a hardware cache user from a software cache user;

User_id: when there are a plurality of hardware cache users/software cache users, User_id is used for distinguishing the hardware cache users from the software cache users;

Request Seq: a request sequence number of a request sent by each hardware cache user/software cache user, starting from 0, and incrementing by 1 for each request;

Key: a parameter data tuple for performing a cache operation, including device_id and Iba, and in this embodiment, the specific numerical value of the Key is indicated by a key value;

device_id: a drive device number;

Iba: a Device LBA address corresponding to a cache line;

Action: indicating which operation is requested, which may be one of the following operations:

alloc: allocating a cache line;

free: releasing a cache line;

check: checking whether data is on a cache line;

Lock: locking a cache line, and the cache line cannot be freed after being locked, and locked is returned from check;

Unlock: unlocking a cache line;

Set Modify: setting the cache data state to "Modified"; and

Set Invalid: setting the cache line data state to "invalid".

It may be seen that in the present disclosure, which type of an operation request a target operation request is may be determined according to Action in the operation request. In this embodiment, the target operation request is any one of the following requests: an allocation request, a release request, a check request, a lock request, an unlock request, and a set request.

S102: the target operation request is processed in a pipeline manner, so as to execute a processing operation corresponding to the target operation request on a cache line using the target operation request.

The hardware cache manager in this embodiment allows a software cache user and a hardware cache user to submit multiple operation requests in an asynchronous manner. When receiving the operation requests initiated by the software cache user and the hardware cache user, the hardware cache manager processes these requests in a hardware pipeline manner, so as to achieve a high throughput rate of cache request processing.

S103: a processing result of the target operation request is fed back to the target user, and a cache maintenance operation corresponding to the processing result is executed according to the processing result by means of a software cache manager.

It may be seen from the above solution that the embodiments of the present disclosure provide the cache management method, which is applied to the storage system cache manager and includes the following content: the target operation request sent by the target user is received; the target operation request is processed in the pipeline manner, so as to execute the corresponding processing operation on the cache line using the target operation request; and the processing result of the target operation request is fed back to the target user, and the corresponding cache maintenance operation is executed according to the processing result by means of the software cache manager.

Hence, in this solution, cache maintenance operations with a low requirement for real-time performance may be implemented by the software cache manager, and operation requests with a high requirement for real-time performance may be processed in parallel in the hardware pipeline manner by the storage system cache manager, thereby reducing the processing delay of cache line operations, and improving the real-time performance of cache management.

As a target user in this solution may be a hardware cache user and a software cache user, in this solution, when a processing result is fed back, it is required to determine which user sends the target operation request specifically, and then feed back an operation result to the corresponding user. The processing result in this solution includes two types: response information and event information. In case that the target operation request is a request sent by the hardware cache user, response information of the target operation request is sent to the hardware cache user, and event information corresponding to the response information is generated and sent to the software cache manager, such that the software cache manager executes a corresponding cache maintenance operation according to the event information; and in case that the target operation request is a request sent by the software cache user, response information of the target operation request is sent to the software cache user, such that the software cache manager executes a corresponding cache maintenance operation according to the response information. That is to say, when responding to an operation request of a software cache user, the hardware cache manager in the present disclosure notifies the software cache manager by means of response information; when responding to a request initiated by a hardware cache user, the hardware cache manager not only needs to send response information to the hardware cache user, but also needs to asynchronously notify the software cache manager by means of event reporting, including behaviors such as cache allocation, usage and query. In this way, the software cache manager may extract useful information from a response/event, so as to complete various complicated cache maintenance tasks. For example, cold and hot data sorting is performed on cache lines of a Device, or cache lines of consecutive addresses are linked, etc.

FIG. 4b is a diagram of format definition of a processing result disclosed in an embodiment of the present disclosure. Same fields in FIG. 4a and FIG. 4b are not described herein again. Each field in the processing result is defined as follows:

SW Hash Value: a hash value of a cache entry calculated by a hardware cache manager and retrieved by a software cache manager;

Type: used for distinguishing response information from event information;

Response: indicating that the processing result is response information;

Event: indicating that the processing result is event information;

Result: indicating request success or failure;

Ok: indicating that the request processing succeeds;

Fail: indicating that the request processing fails;

Status: indicating a cause of success or failure, which is a data tuple including: Invalid/Modified, Miss, Col, Qouta and Locked/Unlocked;

Invalid/Modified: indicating that there is a corresponding cache line in the cache system, and the state is one of the following two states: Invalid or Modified;

Miss: indicating a cache miss, that is, no corresponding cache line is found;

Col: a collision, indicating that cache lines cannot be allocated due to a hash collision in the hardware cache manager;

Qouta: indicating that the requested cache line request exceeds a limit of a certain quota rule;

Locked/Unlocked: indicating that there is a corresponding cache line in the cache system, and the state is one of the following two states: locked or unlocked;

Response/Event Data Length: length of additional data of a response or an event; and Response/Event Data: additional data of a response or an event. With regard to a response and an event of an Alloc, hit or check command, the content thereof is cache Entry; and only when the Alloc applies for a response or an event with a block exceeding a quota, the content thereof is a corresponding over-quota entry in a quota module.

FIG. 5 is a schematic diagram of a correlation between an operation request and response information disclosed in an embodiment of the present disclosure. It may be seen that different operation requests generate different response information according to operation results. Certainly, the correlation shown in FIG. 5 is merely a correlation between requests and responses that may be received, and in actual applications, this solution is not limited to the correlation shown in FIG. 5.

Figure 6:
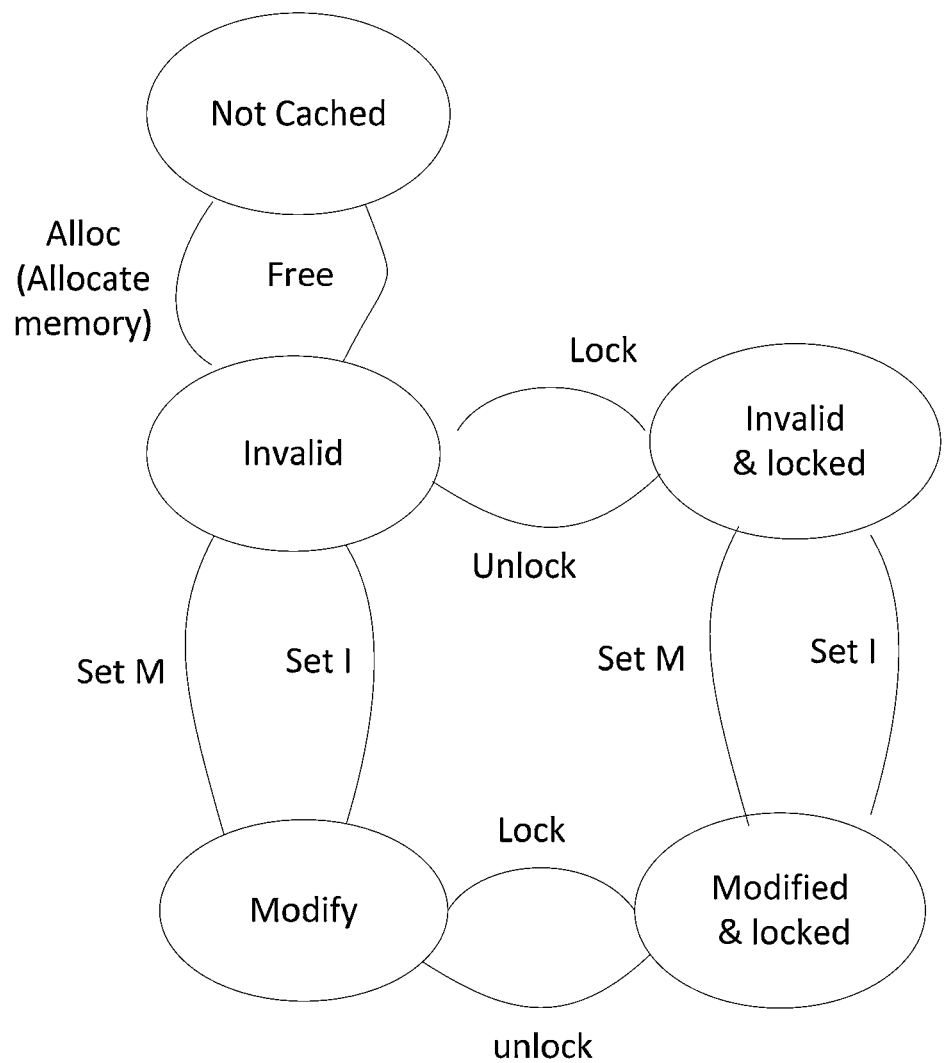
FIG. 6 is a schematic diagram of status switching disclosed in an embodiment of the present disclosure.

FIG. 6 is a schematic diagram of status switching provided in an embodiment of the present disclosure. As shown in FIG. 6, for each cache line, possible states include: Not cached, Invalid, Invalid&locked, Modify, and Modify&locked. The state of the cache line is controlled to switch among a plurality of states by means of an externally inputted operation request. Not cache indicates a state of a cache line that has not been managed by a cache manager, and is not recorded in the cache manager; after the cache line is applied for, the state changes to Invalid, indicating that the cache line has been applied for but data in the cache line is invalid; and in case that a hardware or software cache user needs to occupy a certain cache line exclusively, the state of the cache line may be changed to a Lock state by means of a lock command, for example, Invalid&locked and Modify&locked, and when in the Lock state, the cache line does not support free and cannot be locked again. In case that it is required to mark whether the data in the cache line is rewritten, the cache line may be switched to Modify by means of a set state modify command. When in the modify state, the cache line does not support free.

It should be noted that, the use of the lock state and the modify state is completely decided by the user of the cache manager. In practical applications, the user may use only a subset of action and cache line states according to practical requirements. For example:

1. only the most basic cache allocation, release and hit/miss check functions are supported.
Action: Alloc/Free/Check;
State: Not Cached/Invalid.

2. Support for a cache line lock is added to the most basic cache functions.
Action: Alloc/Free/Check/Lock/Unlock;
State: Not Cached/Invalid/Invalid locked.

3. Support for cache line modify and invalid states is added to the most basic cache functions.
Action: Alloc/Free/Check/Set M/Set I;
State: Not Cached/invalid/Modified.

4. Full function mode, including all Actions and States.

In conclusion, in this solution, cache is managed by means of a combination of software and hardware. Cache maintenance operations with a low requirement for real-time performance may be implemented by a software cache manager, and operation requests with a high requirement for real-time performance may be processed in parallel in a pipeline manner by a hardware cache manager, thereby reducing the processing delay of cache line operations, and improving the real-time performance of cache management.

Figure 7:
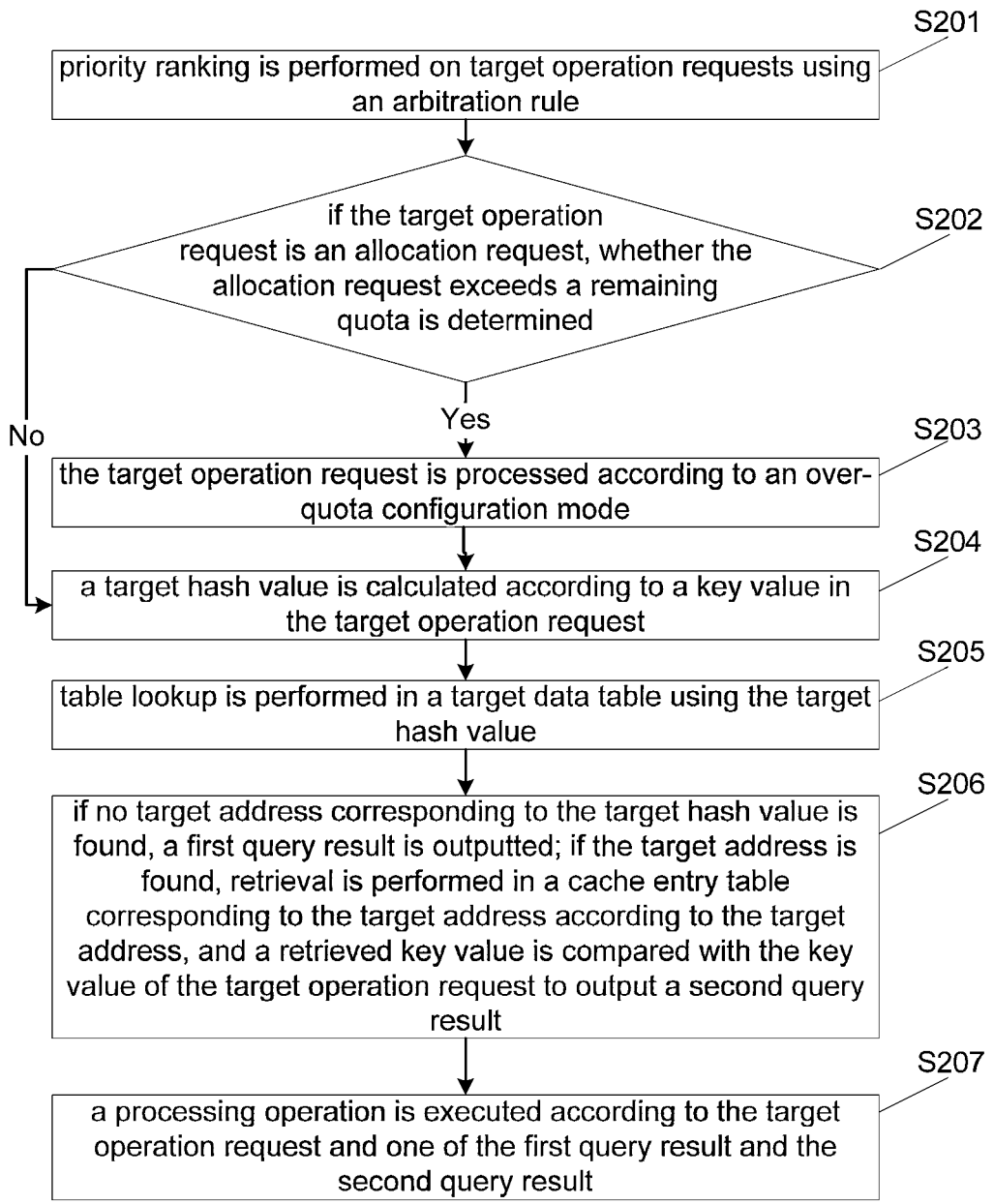
FIG. 7 is a schematic flowchart of processing a target operation request disclosed in an embodiment of the present disclosure.

FIG. 7 is a schematic flowchart of processing a target operation request provided in an embodiment of the present disclosure. As shown in FIG. 7, this embodiment describes a process of executing the processing operation corresponding to the target operation request on the cache line using the target operation request in S102. The process includes the following steps:

S201: priority ranking is performed on target operation requests using an arbitration rule.

Figure 8:
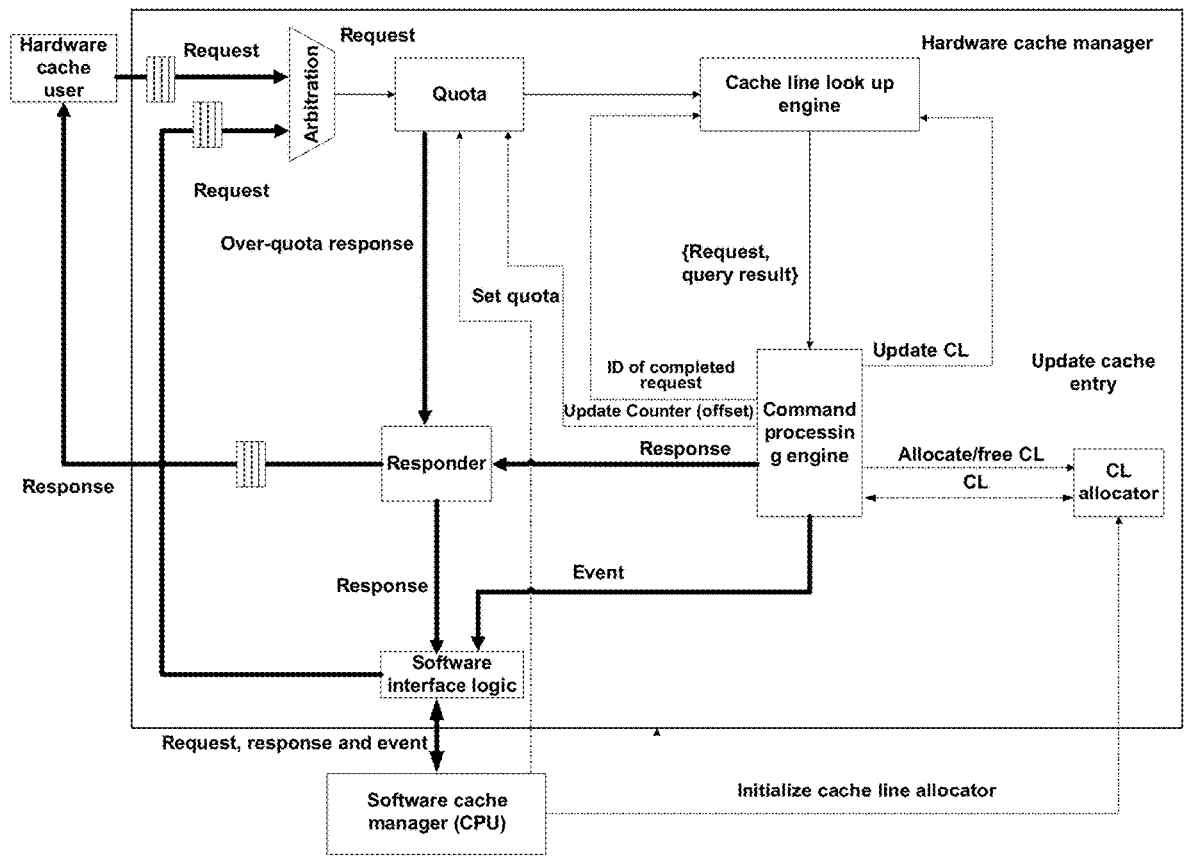
FIG. 8 is an overall schematic structural diagram of a hardware cache manager disclosed in an embodiment of the present disclosure.

FIG. 8 is an overall schematic structural diagram of a hardware cache manager provided in an embodiment of the present disclosure. In this embodiment, multiple cache line operation requests initiated by hardware and software cache users enter a First Input First Output (FIFO) queue in the hardware cache manager for caching, and then are outputted to a quota module after being arbitrated by a certain rule in an arbiter. In this embodiment, the arbitration rule set in the arbiter may be set according to practical requirements, for example, a priority of an operation request sent by the hardware cache user is set to be higher than a priority of an operation request sent by a software cache user, and when priority ranking is performed, the operation request sent by the hardware cache user needs to be arranged before the operation request sent by the software cache user, such that each operation request is sequentially inputted into the quota module according to the priority ranking of each operation request, and subsequent steps are continuously executed.

S202: if the target operation request is an allocation request, whether the allocation request exceeds a remaining quota is determined;

in case that the allocation request exceeds the remaining quota, S203 is executed; and in case that the allocation request does not exceed the remaining quota, S204 is executed.

S203: the target operation request is processed according to an over-quota configuration mode.

In S202, when whether the allocation request exceeds the remaining quota is determined, a key value of the allocation request needs to be determined; a corresponding cache count is determined according to the key value of the allocation request; whether a cache count incremented by 1 is greater than a corresponding first threshold is determined; if the cache count incremented by 1 is greater than the corresponding first threshold, it is determined that the allocation request exceeds the remaining quota; and if the cache count incremented by 1 is less than or equal to the corresponding first threshold, whether a global count after the cache count is incremented by 1 is greater than a corresponding second threshold is determined; if the global count after the cache count is incremented by 1 is greater than the corresponding second threshold, it is determined that the allocation request exceeds the remaining quota; and if the global count after the cache count is incremented by 1 is not greater than the corresponding second threshold, it is determined that the allocation request does not exceed the remaining quota.

The quota module in this solution is responsible for the quota management of each device and the global cache; in case that the inputted Alloc allocation request does not exceed the remaining quota, the quota module forwards the allocation request to a cache line lookup engine (i.e. the cache line lookup engine in FIG. 10); and in case that the inputted Alloc allocation request exceeds the remaining quota, the quota module intercepts the allocation request, and sends an over-quota response to a responder.

Figure 9:
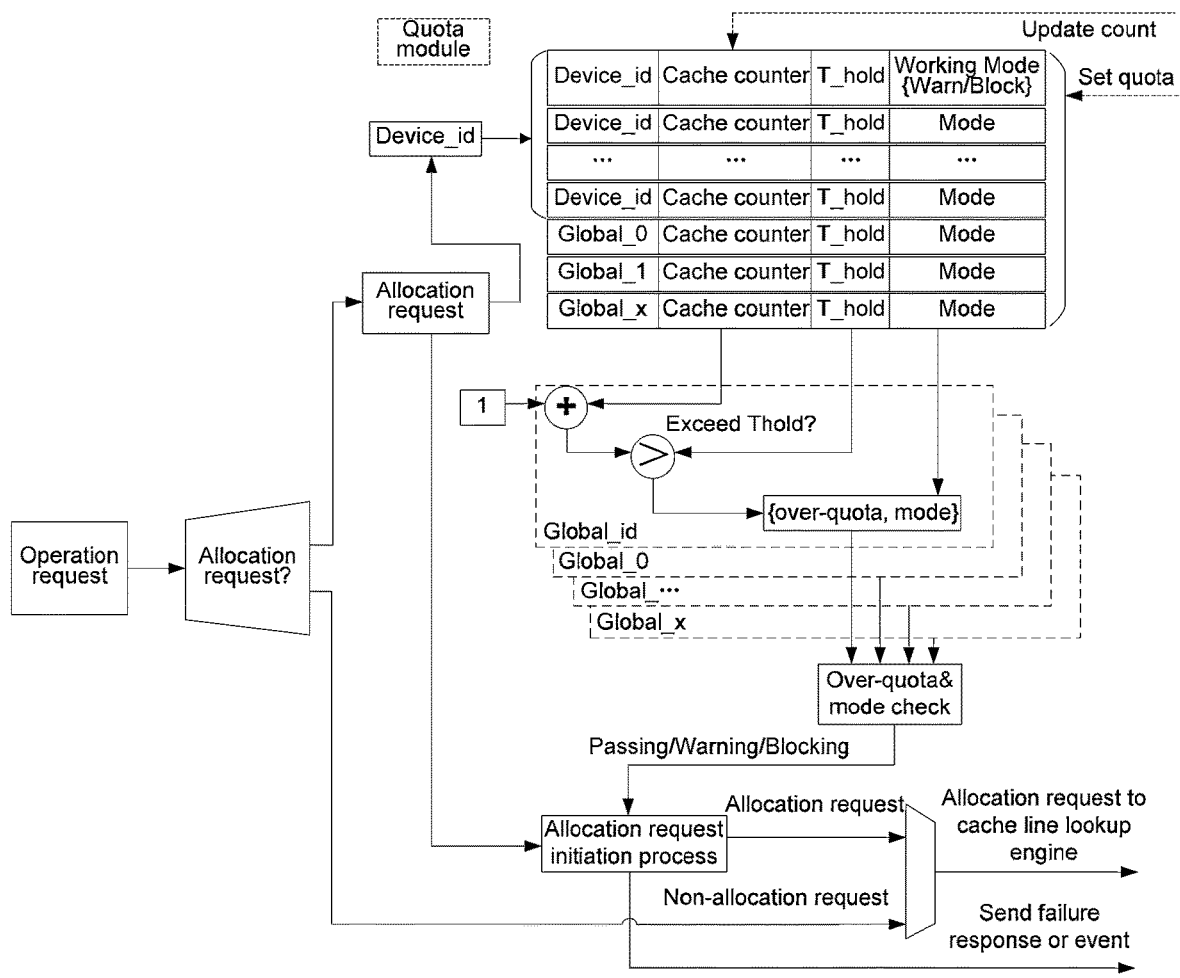
FIG. 9 is a schematic diagram of a work flow of a quota module disclosed in an embodiment of the present disclosure.

The quota module in this solution implements several entries of per-disk cache counters and threshold, and several entries of global cache threshold. FIG. 9 is a schematic diagram of a work flow of a quota module provided in an embodiment of the present disclosure. It may be seen from FIG. 9 that, after an operation request Request is received, for an allocation request Alloc, the quota module extracts device id from a key of the allocation request Alloc, and reads a corresponding cache counter in a quota table entry. It is calculated whether the value of the cache counter incremented by 1 is greater than a first threshold (T_hold). Similarly, all the global entries are checked in parallel. In case that the calculation results indicate that the values are all less than a corresponding second threshold, the allocation request is allowed to pass, and is forwarded to a cache line lookup engine; otherwise, a fail response is returned to a responder.

It should be noted that, in case that the value of the cache counter incremented by 1 is greater than the first threshold, or the values of all global entries are greater than the second threshold, in this case, how to process the operation request may be decided according to an over-quota configuration mode. The over-quota configuration mode of each entry may be configured as a warning mode or a blocking mode. In case that the over-quota configuration mode is a warning mode, S204 is continued to be executed, and corresponding event information is generated and sent to the software cache manager; and in case that the over-quota configuration mode is a blocking mode, a processing result indicating processing failure is directly generated. That is to say, in the warning mode, when it is detected that the threshold is exceeded, the request is still forwarded backwards, but an event is reported to the software cache manager by means of the responder at the same time. In the blocking mode, the quota module directly returns a fail response to the responder; after receiving the fail sent from the quota module, in case that the request is an operation request initiated by the software cache user, the responder reports response information to the software cache manager; in case that the request is an operation request initiated by the hardware cache user, the responder needs to copy and report event information to the software cache manager after reporting the response information to the hardware cache user.

S204: a target hash value is calculated according to a key value in the target operation request.

S205: table lookup is performed in a target data table using the target hash value.

S204 and S205 in this embodiment include the following content: the corresponding target hash value is calculated according to the key value in each target operation request, and the target operation request and the corresponding target hash value are stored into a first target queue; the target hash value of the target operation request for which table lookup is not performed is acquired from the first target queue, and table lookup is performed in the target data table according to the acquired target hash value; the target operation request for which table lookup has been performed and the corresponding target hash value are deleted from the first target queue, and are added to a second target queue; if notification information indicating that the target operation request has been processed is received, the target operation request and the target hash value corresponding to the notification information are deleted from the second target queue.

In this embodiment, in order to avoid a hash collision phenomenon, after the corresponding target hash value is calculated according to the key value in each target operation request, this solution further needs to determine whether the target hash value collides with a hash value of an operation request in the third target queue, and the third target queue includes the first target queue and the second target queue; if the target hash value does not collide with the hash value of the operation request in the third target queue, it is continued to execute the step that the target operation request and the corresponding target hash value are stored into the first target queue; if the target hash value collides with the hash value of the operation request in the third target queue, the step that the target operation request and the corresponding target hash value are stored into the first target queue is suspended; and if it is detected that no hash value colliding with the target hash value exists in the third target queue, it is continued to execute the step that the target operation request and the corresponding target hash value are stored into the first target queue.

Figure 10:
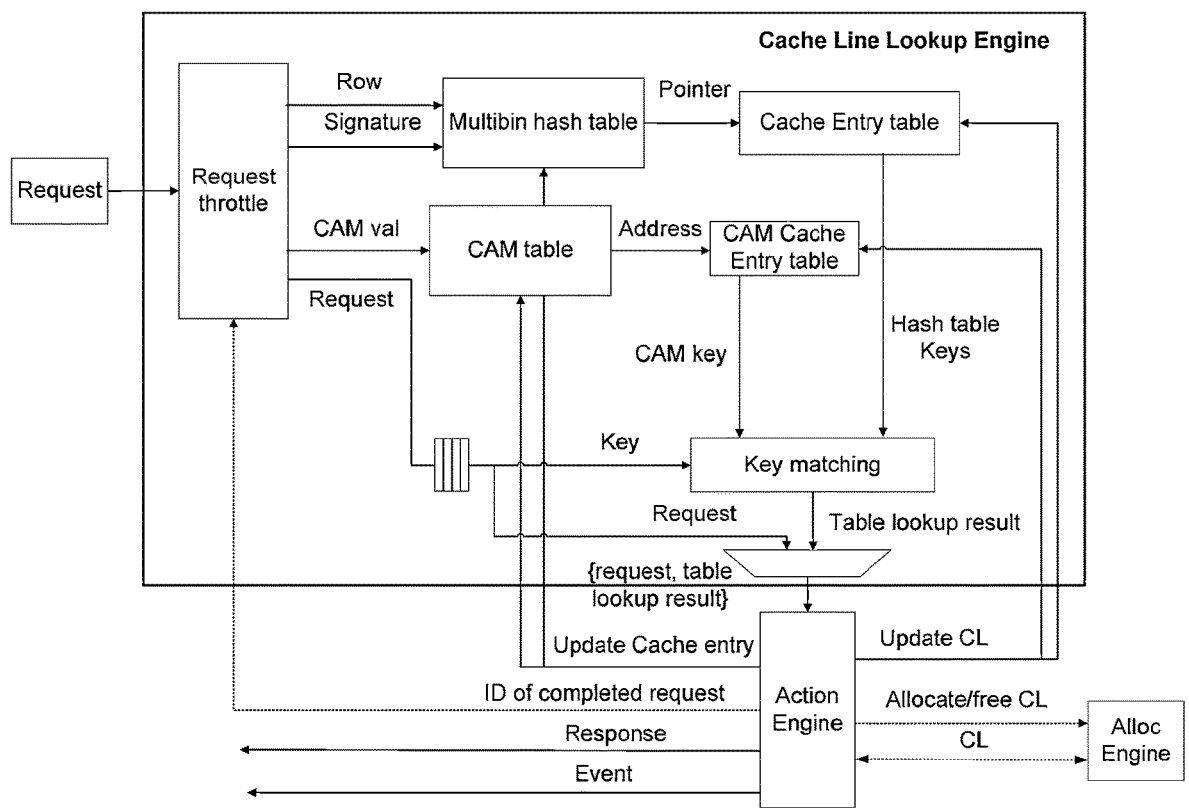
FIG. 10 is a schematic structural diagram of a cache line Lookup engine disclosed in an embodiment of the present disclosure.

In this embodiment, the cache line lookup engine is mainly responsible for looking up a table and outputting a query result, and outputting an operation request and the query result to a command processing engine. FIG. 10 is a schematic structural diagram of a cache line lookup engine provided in an embodiment of the present disclosure. It may be seen from FIG. 10 that after receiving an operation request, the cache line lookup engine first sends same to an internal request throttle module to cache the operation request, and the request throttle module is responsible for controlling the timing for issuing a command, so as to ensure that there is no hash collision at any time between an operation request inputted thereafter and all requests queued in the request throttle module, and the hash collision refers to the situation where two keys with different content produce the same output value after being calculated through a hash function, which is considered a hash collision (Collision). At the same time, the request throttle module also calculates a target hash value for looking up a table from the key, and in this embodiment, the target hash value includes row, signature and CAM val, which are used for looking up a Multibin hash table and a CAM table separately.

Figure 11:
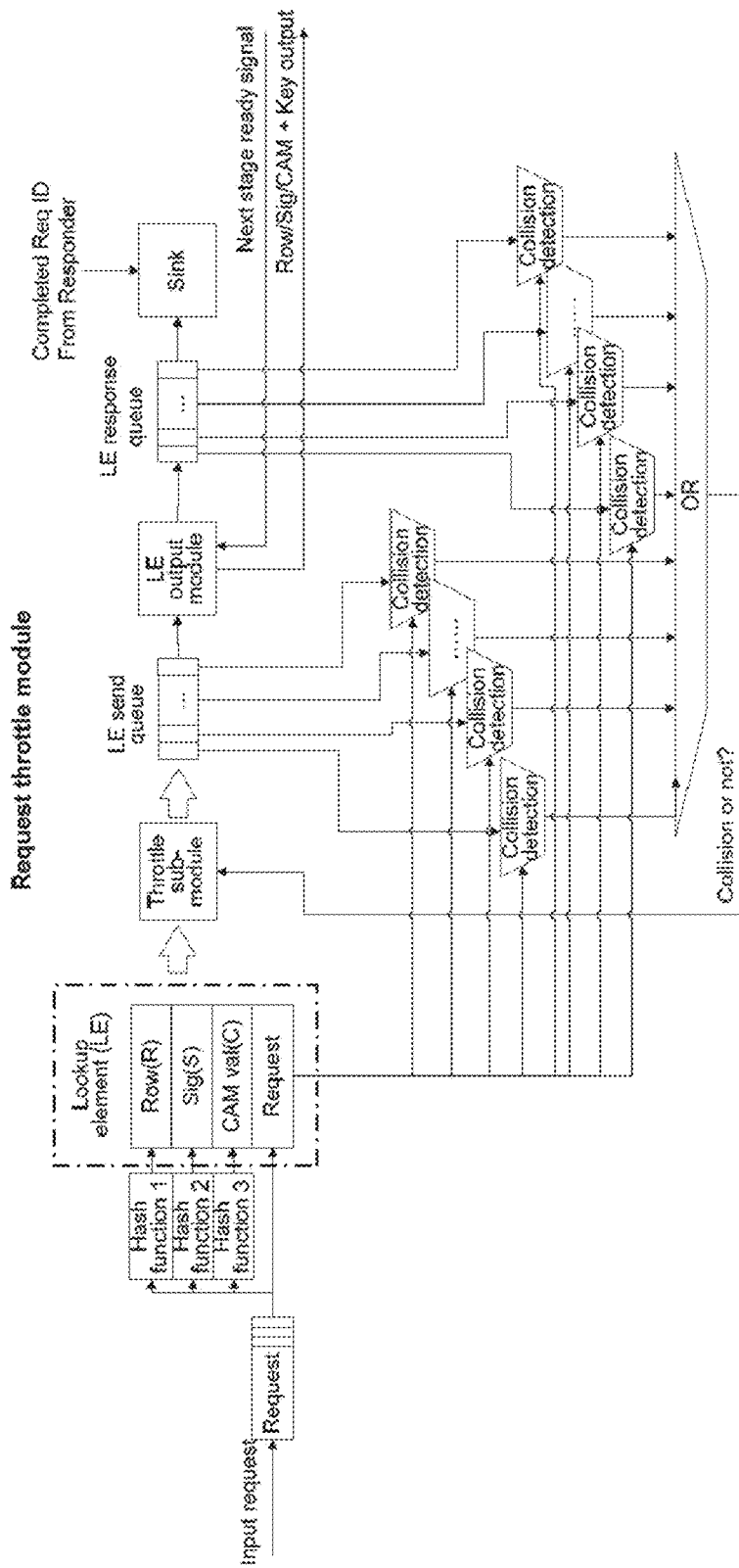
FIG. 11 is a schematic structural diagram of a request throttle module disclosed in an embodiment of the present disclosure.

FIG. 11 is a schematic structural diagram of a request throttle module provided in an embodiment of the present disclosure. It may be seen from FIG. 11 that, after receiving the operation request from the quota module, the request throttle module sends the operation request to a request FIFO queue. The Key of the operation request cached by the FIFO queue is sequentially sent to three hash function calculation modules for calculation to obtain a target hash value, and the target hash value includes three values, i.e. row, sig and CAM val, and the three values are combined with the original request to serve as one lookup element (LE) 0, and is forwarded to an LE send queue under the control of a throttle sub-module. The LE Send Queue temporarily stores the LE to be sent to a downstream module for table lookup. An LE output module reads an LE from the LE send queue under the control of a next_stage_ready signal, and sends the LE to a target data table for table lookup. In this solution, the target data table includes a mutilbin hash table and a CAM table. At the same time, the LE output module copies the LE sent for table lookup and sends same to an LE response queue. It should be noted that, each time an operation request is processed by the command processing engine, the command processing engine sends ID information of the request which is completed to a sink module; the sink module compares the ID information of the request with a queue head element of the LE response queue, and in case that they match, then reads one LE from the LE response queue and discards same.

It may be seen from the described content that this solution needs to detect, at any time, whether a target hash value collides with a hash value of an operation request in a third target queue (includes a first target queue and a second target queue), and the target hash value refers to a hash value in an LE to be entered into an LE send queue, and the third target queue refers to the LE send queue (the first target queue) and an LE response queue (the second target queue). That is, this solution needs to compare all elements of the LE send queue and the LE response queue with the LE to be entered into the LE send queue, and only when the Row, Sig and CAM val do not collide, the LE is allowed to enter into the LE send queue through a throttle module. Otherwise, the current LE is blocked, and is allowed to pass after all the colliding LEs in the LE send queue and the LE response queue are served, i.e. after being discarded by the sink. This mechanism may ensure that the process from table lookup to execution (command processing engine) of a plurality of colliding requests is serial, while non-colliding requests are executed concurrently in a pipelined manner.

S206: if no target address corresponding to the target hash value is found, a first query result is outputted; if the target address is found, retrieval is performed in a cache entry table corresponding to the target address according to the target address, and a retrieved key value is compared with the key value of the target operation request to output a second query result.

Figure 12:
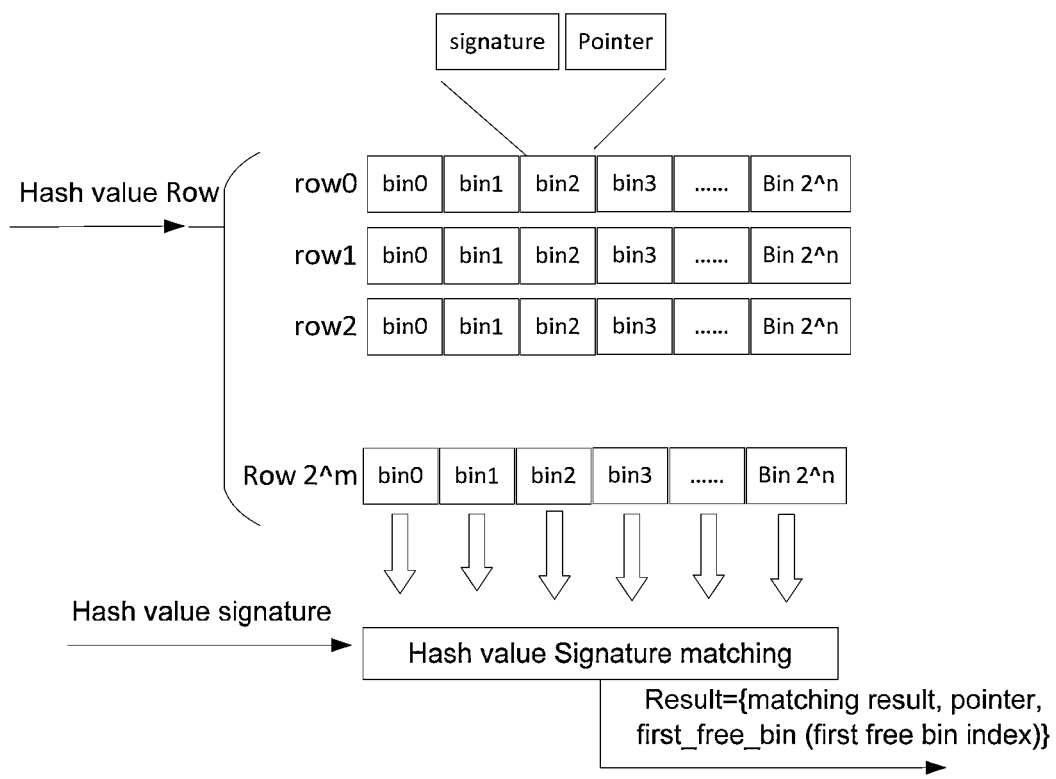
FIG. 12 is a schematic structural diagram of a Multibin hash table disclosed in an embodiment of the present disclosure.

In this embodiment, there are two table lookup mechanisms in the cache line lookup engine, and the target data table includes a Multibin hash table and a CAM table. Referring to FIG. 10, after the request throttle module outputs three hash values of the operation request, table lookup needs to be performed in the Multibin hash table and the CAM table. FIG. 12 is a schematic structural diagram of a Multibin hash table provided in an embodiment of the present disclosure. The Multibin hash table is a two-dimensional hash table having $2^m$ rows and $2^n$ columns. When looking up a table, the row needs to be selected according to the inputted Row value with the width of m, and then matching is performed for each row of data according to the inputted signature value. A matching output result includes the following three:

1. matched. The value of 1 indicates that the same signature value is matched.
2. pointer. A pointer value is stored in a bin of the signature matched.
3. first_free_bin. It indicates the index of the first idle bin in this row. It is used when the command processing engine inserts a new entry.

It is defined that pointer=0 is an invalid value, and during initialization, all elements in the bins are initialized to 0.

As shown in FIG. 10, after table lookup in the Multibin hash table according to the Row value and the signature value, a pointer may be outputted from a matching result, and the pointer may point to a target address in a cache entry table; likewise, after table lookup in the CAM table according to the CAM val value, the target address may be obtained. In case that no matched target address is found in the two tables, it means a cache line miss; and in case that the pointer/address is found, retrieval is performed in a corresponding cache entry table according to the target address, and the numerical value of the key in a retrieval result is compared with the numerical value of the original key in an operation request, and in case that a completely matched entry is found after comparison, it means a cache line hit, and in case that no completely matched entry is found, it means cache line miss, and a query result of the cache line and an original operation request are sent to a command processing engine after being spliced.

S207: a processing operation is executed according to the target operation request and one of the first query result and the second query result.

In this embodiment, the command processing engine may perform a corresponding processing operation according to the cache line query result sent by the cache line Lookup engine and the action in the target operation request, including requesting or releasing a cache line from a cache line allocator, updating a Multibin hash table and a CAM, updating a cache entry table, organizing a response and an event and sending same to a responder, and updating the count of a quota module.

Figure 13A:
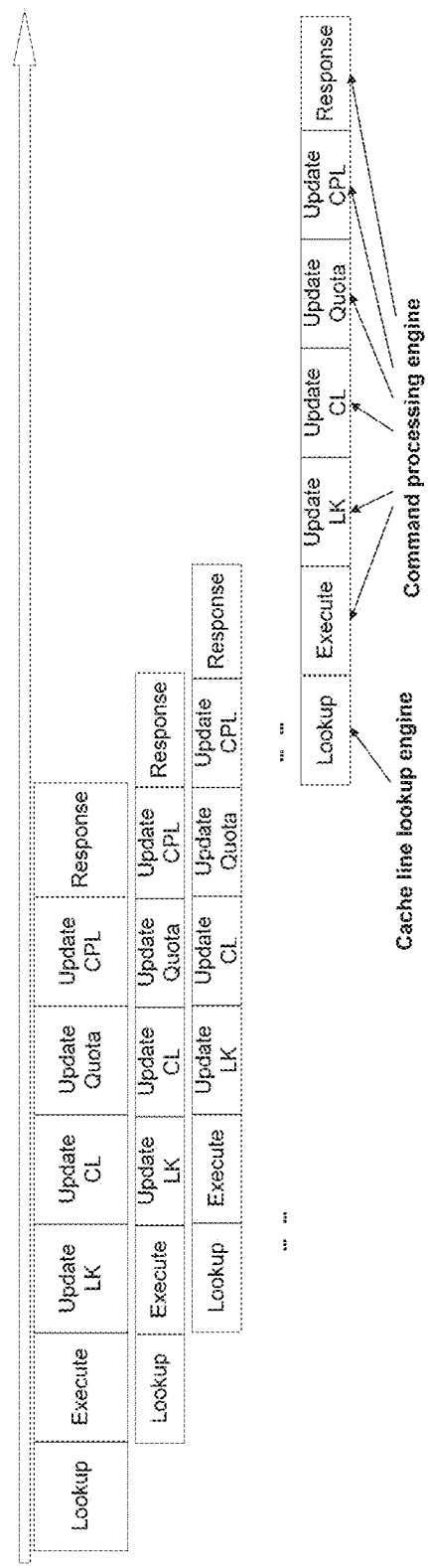
FIG. 13a is a schematic diagram of processing an operation request in a pipeline manner disclosed in an embodiment of the present disclosure.

It should be noted that, in this embodiment, the command processing engine collaborates with the cache line Lookup engine, and completes processing of each operation request in parallel in a multi-stage pipeline manner. Each stage of the command processing engine pipeline is implemented by a state machine, and after the working of the current stage is completed, a processing result is transferred to a next stage of the pipeline. FIG. 13a is a schematic diagram of processing an operation request in a pipeline manner provided in an embodiment of the present disclosure. The naming and function description of each stage in the pipeline in FIG. 13a are as follows:

Lookup: cache line table lookup, implemented by a cache line lookup engine.
Execute: responsible for processing a request, extracting an action and executing a corresponding operation, and generating an instruction for a subsequent pipeline.
Update LK: updating a Multibin hash table and a CAM in the cache line lookup engine.
Update CL: updating a cache entry table.
Update quota: updating a counter and a global counter corresponding to the device id in a quota module.
Update CPL: notifying the cache line lookup engine that the processing of the request has been completed.
Response: sending a response to a responder.

It should be noted that not all types of commands require each stage of pipeline to participate in processing. FIG. 13b is another schematic diagram of processing an operation request in a pipeline manner provided in an embodiment of the present disclosure. As shown in FIG. 13b, in case that some commands do not require a certain stage of pipeline, an NOP instruction is generated during execution and the stage is skipped.

In this embodiment, a cache line allocator manages application and release of a cache line; when a command processing engine sends an Alloc operation command, a cache line resource pool in the cache line allocator acquires a cache line and returns same to the command processing engine. When a release command is received, the released cache line is stored in an internal resource pool. The cache line allocator is implemented by a conventional circular queue, and has head and tail pointers pointing to the head node and the tail node respectively therein. When a system initializes, a software cache manager fills all the cache lines. When an Alloc request is received, an element is read out from the head pointer, and then the head pointer modulo is incremented by 1. When a Free request is received, the inputted element is placed in the tail pointer, and then the tail pointer modulo is incremented by 1. When the queue is empty, fail is returned for the Alloc request. When the queue is full, fail is returned for the Free request.

In this embodiment, a responder is responsible for receiving a quota and a response and an event that are sent by the command processing engine, and distinguishing, according to information in the response, whether the response is sent to hardware or software; and in case that it needs to be sent to the hardware, the response is directly signaled to a corresponding hardware cache user by means of an interface of the hardware cache user. In case that it needs to be sent to the software, the response is forwarded to the software interface logic. The software/hardware interface logic is internally responsible for receiving a cache operation request issued by a software cache manager, sending the operation request to a hardware cache manager, converging response information sent by a responder in the hardware cache manager and event information sent by the command processing engine, and reporting same to the software cache manager. The software/hardware interface uses a single request and response queue, and the interaction flow is the same as the Input/Output (IO) queue protocol of Non Volatile Memory Express (NVMe).

FIG. 14 is a schematic structural diagram of a software cache manager provided in an embodiment of the present disclosure. In this embodiment, the software cache manager is implemented based on a conventional software cache management mechanism. The software Hash table part in FIG. 14 has the same management logic as conventional software cache Hash tables. On this basis, a request processing module is added to a software cache manager, and the request processing module is used for receiving an Application Programming Interface (API for short) call of a software cache user, organizing a cache operation request and receiving a response. A response/event distribution module is responsible for acquiring response information and event information from a response/event queue, and the response information and the event information in the queue are issued by a hardware cache manager, and the response information and the event information are distinguished and distributed in the software cache manager. The event information is directly routed to a software Hash table for entry updating, and the response information is sent to the request processing module; and after the request processing module processes a response, it is changed to an event, and the software Hash table is notified to update.

It should be noted that, this solution is applicable to a scenario in which cache buffering needs to be performed on a storage medium during storage acceleration, and a hardware acceleration engine and a software task require operation of cache in parallel. To describe this solution in detail, flows of processing an operation request initiated by a hardware cache user and a software cache user are described herein separately by examples:

In case that an example is taken in which the operation request is initiated by the hardware cache user and an Alloc request for cache line allocation in the multibin hash table is provided, complete operation steps are as follows:
1. the hardware cache user sends a cache line operation request, and sends same to a quota module by means of an Arbiter_0;
2. the quota module checks device and global threshold entries of the Alloc request, and finds that the remaining quota is not exceeded, and the quota module forwards the request to a downstream cache line lookup module;
3. after receiving the request, the cache line lookup completes searching for the key, finds that no cache hit exists in the multibin hash table, and outputs a result to a command processing engine module;
5. the command processing engine finds that it is an Alloc command and the multibin hash table does not have a hit, the command processing engine applies to alloc engine and obtains a cache line;
6. the command processing engine updates a cache line entry of the first_free_bin address of the corresponding row in the Multibin hash table to signature and pointer;
7. the command processing engine updates a cache Entry Table, the content of which includes a cache line address obtained by Alloc allocation;
8. the command processing engine sends response information to a responder;
9. the responder sends to the quota module an instruction of incrementing 1 to the corresponding device ID quota Entry;
10. the command processing engine sends a completion Req ID to the cache line lookup module; and
11. the responder sends a response to the hardware cache user.

In case that an example is taken in which the operation request is initiated by the software cache user and an Alloc request for cache line allocation in the CAM is provided, complete operation steps are as follows:
1. the software cache user sends a cache line operation request, and sends same to a quota module by means of an Arbiter_0;
2. the quota module checks Device and Global threshold entries of the Alloc request, and finds that the remaining quota is not exceeded, and the quota module forwards the request to a downstream cache line lookup module;
3. after receiving the request, the cache line lookup completes searching for the Key, and finds that the multibin hash table has collided, and there is no idle entry in the consecutively read address; however, there is no matching entry in the CAM, and the result is outputted to a command processing engine module;
5. the command processing engine applies for and obtains a cache line from an Alloc Engine according to the cache line query result;
6. the command processing engine updates the CAM table, and adds cache entry to the CAM table;
7. the command processing engine updates the CAM cache entry table;
8. the command processing engine sends response information to a responder;
9. the command processing engine sends a completion Req ID to the cache line lookup module;
10. the command processing engine sends the response information to a software interface; and
11. the software cache manager reads a response from the interface, calculates a hash value, and adds cache entry to a software Hash table.

In conclusion, it may be seen that this solution discloses a cache management solution combining software and hardware. In this solution, hardware is used to implement the query, allocation and release logic of a cache line, reducing a delay of a cache line operation, and satisfying the requirements for high throughput rate and high flexibility. This solution also supports cache line concurrent access initiated by hardware and software, and ensures consistency of the cache line by means of a mechanism of cache line lock and cache line state. This solution realizes real-time threshold detection and interception by a quota module. By means of the technology of collision detection and avoidance, this solution realizes the pipeline processing of the cache line request on the premise of ensuring the consistency of cache.

The following describes a cache management apparatus and system, a device and a nonvolatile readable storage medium provided in the embodiments of the present disclosure. For the cache management apparatus and system, the device and the nonvolatile readable storage medium that are described below and the cache management method that is described above, reference may be made to each other.

FIG. 15 is a schematic structural diagram of a cache management apparatus disclosed in an embodiment of the present disclosure. The cache management apparatus is applied to a storage system cache manager. The cache management apparatus includes:

a receiving module 11, configured to receive a target operation request sent by a target user;

a processing module 12, configured to process the target operation request in a pipeline manner, so as to execute a processing operation corresponding to the target operation request on a cache line using the target operation request; and a sending module 13, configured to feed back a processing result of the target operation request to the target user, and execute a cache maintenance operation corresponding to the processing result according to the processing result by means of a software cache manager.

The processing module 12 includes:

a table lookup component, configured to calculate a target hash value according to a key value in the target operation request, and perform table lookup in a target data table using the target hash value;

an output component, configured to, if no target address corresponding to the target hash value is found, output a first query result; and if the target address is found, perform retrieval in a cache entry table corresponding to the target address according to the target address, and compare a retrieved key value with the key value of the target operation request to output a second query result; and a first processing component, configured to execute a processing operation according to the target operation request and one of the first query result and the second query result.

The processing module 12 further includes:

a ranking component, configured to perform priority ranking on target operation requests using an arbitration rule; and a first determining component, configured to, if the target operation request is an allocation request, determine whether the allocation request exceeds a remaining quota; if the allocation request does not exceed the remaining quota, trigger a calculation component to calculate the target hash value according to the key value in the target operation request; and if the allocation request exceeds the remaining quota, process the target operation request according to an over-quota configuration mode by means of a second processing component.

The first determining component is configured to: determine a key value of the allocation request; determine a corresponding cache count according to the key value of the allocation request; determine whether a cache count incremented by 1 is greater than a corresponding first threshold; if the cache count incremented by 1 is greater than the corresponding first threshold, determine that the allocation request exceeds the remaining quota; and if the cache count incremented by 1 is less than or equal to the corresponding first threshold, determine whether a global count after the cache count is incremented by 1 is greater than a corresponding second threshold; if the global count after the cache count is incremented by 1 is greater than the corresponding second threshold, determine that the allocation request exceeds the remaining quota; and if the global count after the cache count is incremented by 1 is not greater than the corresponding second threshold, determine that the allocation request does not exceed the remaining quota.

The second processing component is configured to: if the over-quota configuration mode is a warning mode, continue to calculate the target hash value according to the key value in the target operation request, and generate corresponding event information and send same to the software cache manager; and if the over-quota configuration mode is a blocking mode, directly generate a processing result indicating processing failure.

The table lookup component is configured to: calculate the corresponding target hash value according to the key value in each target operation request, and store the target operation request and the corresponding target hash value into a first target queue; acquire, from the first target queue, the target hash value of the target operation request for which table lookup is not performed, and perform table lookup in the target data table according to the acquired target hash value; delete, from the first target queue, the target operation request for which table lookup has been performed and the corresponding target hash value, and add same to a second target queue; and if notification information indicating that the target operation request has been processed is received, delete, from the second target queue, the target operation request and the target hash value corresponding to the notification information.

The table lookup component is further configured to: determine whether the target hash value collides with a hash value of an operation request in a third target queue, and the third target queue includes the first target queue and the second target queue; if the target hash value does not collide with the hash value of the operation request in the third target queue, continue to execute the step of storing the target operation request and the corresponding target hash value into the first target queue; if the target hash value collides with the hash value of the operation request in the third target queue, suspend storing the target operation request and the corresponding target hash value into the first target queue; and if it is detected that no hash value colliding with the target hash value exists in the third target queue, continue to execute the step of storing the target operation request and the corresponding target hash value into the first target queue.

The target operation request is any one of the following requests: an allocation request, a release request, a check request, a lock request, an unlock request, and a set request.

The receiving module 11 is configured to receive the target operation request sent by the hardware cache user or a target operation request sent by the software cache user by means of the software cache manager.

The sending module 13 includes:

a first sending component, configured to, in case that the target operation request is a request sent by the hardware cache user, send response information of the target operation request to the hardware cache user, and generate event information corresponding to the response information and send same to the software cache manager, such that the software cache manager executes a corresponding cache maintenance operation according to the event information; and a second sending component, configured to, if the target operation request is a request sent by the software cache user, send response information of the target operation request to the software cache user, such that the software cache manager executes a corresponding cache maintenance operation according to the response information.

Also disclosed in the embodiments of the present disclosure is a cache management system. The system includes:
a storage system cache manager, configured to receive a target operation request sent by a target user, process the target operation request in a pipeline manner, so as to execute a processing operation corresponding to the target operation request on a cache line using the target operation request, and feed back a processing result of the target operation request to the target user; and
a software cache manager, configured to execute a cache maintenance operation corresponding to the processing result according to the processing result.

The storage system cache manager is configured to: calculate a target hash value according to a key value in the target operation request, and perform table lookup in a target data table using the target hash value; if no corresponding target address is found, output a first query result; if a target address is found, perform retrieval in a corresponding cache entry table according to the target address, and compare a retrieved key value with the key value of the target operation request to output a second query result; and execute a corresponding processing operation according to the target operation request and one of the first query result and the second query result.

The storage system cache manager is further configured to perform priority ranking on target operation requests using an arbitration rule.

The storage system cache manager is further configured to: if the target operation request is an allocation request, determine whether the allocation request exceeds a remaining quota; if the allocation request does not exceed the remaining quota, continue to execute the step of calculating the target hash value according to the key value in the target operation request; and if the allocation request exceeds the remaining quota, process the target operation request according to an over-quota configuration mode.

The storage system cache manager is configured to: determine a key value of the allocation request; determine a corresponding cache count according to the key value of the allocation request; determine whether a cache count incremented by 1 is greater than a corresponding first threshold; if the cache count incremented by 1 is greater than the corresponding first threshold, determine that the allocation request exceeds the remaining quota; and if the cache count incremented by 1 is less than or equal to the corresponding first threshold, determine whether a global count after the cache count is incremented by 1 is greater than a corresponding second threshold; if the global count after the cache count is incremented by 1 is greater than the corresponding second threshold, determine that the allocation request exceeds the remaining quota; and if the global count after the cache count is incremented by 1 is not greater than the corresponding second threshold, determine that the allocation request does not exceed the remaining quota.

The storage system cache manager is configured to: if the over-quota configuration mode is a warning mode, continue to calculate the target hash value according to the key value in the target operation request, and generate corresponding event information and send same to the software cache manager; and if the over-quota configuration mode is a blocking mode, directly generate a processing result indicating processing failure.

The storage system cache manager is configured to: calculate the corresponding target hash value according to the key value in each target operation request, and store the target operation request and the corresponding target hash value in a first target queue; acquire, from the first target queue, the target hash value of the target operation request for which table lookup is not performed, and perform table lookup in the target data table according to the acquired target hash value; delete, from the first target queue, the target operation request for which table lookup has been performed and the corresponding target hash value, and add same to a second target queue; and if notification information indicating that the target operation request has been processed is received, delete, from the second target queue, the target operation request and the target hash value corresponding to the notification information.

The storage system cache manager is further configured to: determine whether the target hash value collides with a hash value of an operation request in a third target queue, and the third target queue includes the first target queue and the second target queue; if the target hash value does not collide with the hash value of the operation request in the third target queue, continue to execute the step of storing the target operation request and the corresponding target hash value into the first target queue; if the target hash value collides with the hash value of the operation request in the third target queue, suspend storing the target operation request and the corresponding target hash value into the first target queue; and if it is detected that no hash value colliding with the target hash value exists in the third target queue, continue to execute the step of storing the target operation request and the corresponding target hash value into the first target queue.

The target operation request is any one of the following requests: an allocation request, a release request, a check request, a lock request, an unlock request, and a set request.

The storage system cache manager is configured to: receive the target operation request sent by the hardware cache user or a target operation request sent by the software cache user by means of the software cache manager.

The storage system cache manager is configured to: in case that the target operation request is a request sent by the hardware cache user, send response information of the target operation request to the hardware cache user, and generate event information corresponding to the response information and send same to the software cache manager, such that the software cache manager executes a corresponding cache maintenance operation according to the event information; and in case that the target operation request is a request sent by the software cache user, send response information of the target operation request to the software cache user, such that the software cache manager executes a corresponding cache maintenance operation according to the response information.

Figure 16:
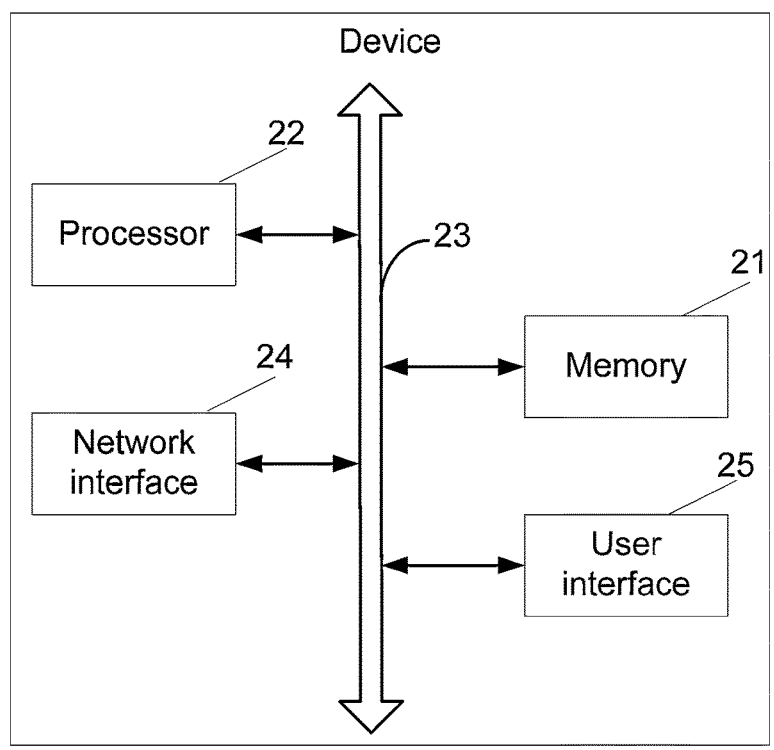
FIG. 16 is a schematic structural diagram of an electronic device disclosed in an embodiment of the present disclosure.

FIG. 16 is a schematic structural diagram of an electronic device disclosed in an embodiment of the present disclosure, including:
a memory, configured to store a computer program; and
a processor, configured to implement the steps of the cache management method in the described method embodiment when executing the computer program.

In this embodiment, the device may be a Personal Computer (PC), and may also be a terminal device such as a smart phone, a tablet computer, a palmtop computer, and a portable computer.

The device may include a memory 21, a processor 22 and a bus 23.

The memory 21 includes at least one type of nonvolatile readable storage medium, and the nonvolatile readable storage medium includes a flash memory, a hard disk, a multimedia card, a card-type memory (for example, an SD or DX memory), a magnetic memory, a magnetic disk, an optical disk, and so on. The memory 21 may in some embodiments be an internal storage component of the device, for example, a hard disk of the device. In other embodiments, the memory 21 may also be an external storage device of the device, for example, a plug-in hard disk, a Smart Media Card (SMC), a Secure Digital (SD) card, and a Flash Card that are equipped on the device. The memory 21 may also include both an internal storage component of the device and an external storage device. The memory 21 may be used not only to store application software installed in the device and various types of data, such as a program code for executing the cache management method, but also to temporarily store data that has been outputted or is to be outputted.

In some embodiments, the processor 22 may be a Central Processing Component (CPU), a controller, a micro controller, a microprocessor, or another data processing chip, and is configured to run a program code stored in the memory 21 or process data, such as a program code for executing the cache management method.

The bus 23 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is shown in FIG. 16, which does not mean there is only one bus or one type of bus.

The device may also include a network interface 24. The network interface 24 may optionally include a wired interface and/or a wireless interface (such as a Wi-Fi interface and a Bluetooth interface), and is generally used to establish a communication connection between the device and another electronic device.

Optionally, the device may further include a user interface 25. The user interface 25 may include a Display and an input component such as a Keyboard. The user interface 25 may optionally further include a standard wired interface and a standard wireless interface. Optionally, in some embodiments, the display may be an LED display, a liquid crystal display, a touch liquid crystal display, an Organic Light-Emitting Diode (OLED) touch device, or the like. The display may also be appropriately referred to as a display screen or a display component, and is configured to display information processed in the device and display a visual user interface.

FIG. 16 only shows a device including components 21-25. A person skilled in the art may understand that the structure shown in FIG. 16 does not limit the device, and may include fewer or more components than those shown in the figure, or a combination of some components, or have a different component arrangement.

Further disclosed in the embodiments of the present disclosure is a computer nonvolatile readable storage medium, and the computer nonvolatile readable storage medium stores a computer program which, when executed by a processor, implements the steps of the cache management method in the described method embodiment.

The nonvolatile readable storage medium may include: any medium that may store program codes, such as a USB flash disk, a removable hard disk, a Read-Only Memory (ROM), a Random Access Memory (RAM), a magnetic disk, or an optical disk.

The embodiments in this description are described in a progressive manner, each embodiment focuses on a part different from other embodiments, and reference may be made to each other for the same or similar parts of the embodiments.

The above descriptions of the disclosed embodiments enable a person skilled in the art to implement or use the present disclosure. Various modifications to these embodiments would have readily occurred to those skilled in the art. The general principles defined herein may be implemented in other embodiments without departing from the spirit or scope of the present disclosure. Accordingly, the present disclosure will not be limited to the embodiments shown herein but is to be in accord with the widest scope consistent with the principles and novel features disclosed herein.

What is claimed is:

1. A cache management method, wherein the cache management method is applied to a storage system cache manager, and the cache management method comprises:
   receiving a plurality of target operation requests sent by a target user, wherein the target user comprises a software cache user or a hardware cache user;
   processing the plurality of target operation requests in a pipeline manner, so as to execute a processing operation corresponding to each target operation request on a cache line using the target operation request; and
   feeding back a processing result of each target operation request to the target user, and based on the processing result, executing a cache maintenance operation corresponding to the processing result by means of a software cache manager.

2. The cache management method as claimed in claim 1, wherein executing the processing operation corresponding to each target operation request on the cache line using the target operation request comprises:
   calculating a target hash value according to a key value in each target operation request;
   performing table lookup in a target data table using the target hash value;
   if no target address corresponding to the target hash value is found, outputting a first query result; if the target address is found, performing retrieval in a cache entry table corresponding to the target address according to the target address, and comparing a retrieved key value with the key value of the target operation request to output a second query result; and
   executing a processing operation according to each target operation request and one of the first query result and the second query result.

3. The cache management method as claimed in claim 2, wherein before calculating the target hash value according to the key value in each target operation request, the method further comprises:
   performing priority ranking on the plurality of target operation requests using an arbitration rule.

4. The cache management method as claimed in claim 3, wherein after performing priority ranking on the plurality of target operation requests using the arbitration rule, the method further comprises:
   if one target operation request is an allocation request, determining whether the allocation request exceeds a remaining quota;

if the allocation request does not exceed the remaining quota, continuing to execute calculating the target hash value according to the key value in the target operation request; and if the allocation request exceeds the remaining quota, processing the target operation request according to an over-quota configuration mode.

5. The cache management method as claimed in claim 4, wherein determining whether the allocation request exceeds the remaining quota comprises:
determining a key value of the allocation request;
determining a cache count corresponding to the key value of the allocation request according to the key value of the allocation request;
determining whether a cache count incremented by 1 is greater than a corresponding first threshold;
if the cache count incremented by 1 is greater than the corresponding first threshold, determining that the allocation request exceeds the remaining quota; and if the cache count incremented by 1 is less than or equal to the corresponding first threshold, determining whether a global count after the cache count is incremented by 1 is greater than a corresponding second threshold;
if the global count after the cache count is incremented by 1 is greater than the corresponding second threshold, determining that the allocation request exceeds the remaining quota; and if the global count after the cache count is incremented by 1 is not greater than the corresponding second threshold, determining that the allocation request does not exceed the remaining quota.

6. The cache management method as claimed in claim 4, wherein processing the target operation request according to the over-quota configuration mode comprises:
if the over-quota configuration mode is a warning mode, continuing to calculate the target hash value according to the key value in the target operation request, and generating corresponding event information and sending same to the software cache manager; and
if the over-quota configuration mode is a blocking mode, directly generating a processing result indicating processing failure.

7. The cache management method as claimed in claim 6, wherein after directly generating the processing result indicating processing failure, the method further comprises:
if the target operation request is an operation request initiated by a software cache user, reporting response information to the software cache manager, wherein the target user comprises the software cache user; and
if the target operation request is an operation request initiated by a hardware cache user, reporting response information to a hardware cache user, and copying event information and reporting same to the software cache manager, wherein the target user comprises the hardware cache user.

8. The cache management method as claimed in claim 3, wherein performing priority ranking on the plurality of target operation requests using the arbitration rule comprises:
setting a priority of an operation request sent by the hardware cache user to be higher than a priority of an operation request sent by a software cache user.

9. The cache management method as claimed in claim 2, wherein calculating the target hash value according to the key value in each target operation request, and performing table lookup in the target data table using the target hash value comprise:
calculating the target hash value corresponding to the key value in each target operation request according to the key value in each target operation request, and storing each target operation request and the target hash value corresponding to each target operation request into a first target queue;
acquiring, from the first target queue, the target hash value of each target operation request for which table lookup is not performed, and performing table lookup in the target data table according to the acquired target hash value;
deleting, from the first target queue, each target operation request for which table lookup has been performed and the target hash value corresponding to the target operation request for which table lookup has been performed, and adding same to a second target queue; and
if notification information indicating that one target operation request has been processed is received, deleting, from the second target queue, the target operation request and the target hash value corresponding to the notification information.

10. The cache management method as claimed in claim 9, wherein calculating the target hash value corresponding to the key value in each target operation request according to the key value in each target operation request comprises:
sequentially sending the key value in the each target operation request to three hash function calculation modules for calculation, so as to obtain the target hash value, wherein the target hash value comprises row, sig and CAM val.

11. The cache management method as claimed in claim 9, wherein after calculating the target hash value corresponding to the key value in each target operation request according to the key value in each target operation request, the method further comprises:
determining whether the target hash value collides with a hash value of an operation request in a third target queue, wherein the third target queue comprises the first target queue and the second target queue;
if the target hash value does not collide with the hash value of the operation request in the third target queue, continuing to execute storing each target operation request and the target hash value corresponding to each target operation request into the first target queue;
if the target hash value collides with the hash value of the operation request in the third target queue, suspending storing each target operation request and the target hash value corresponding to each target operation request into the first target queue; and if it is detected that no hash value colliding with the target hash value exists in the third target queue, continuing to execute storing each target operation request and the target hash value corresponding to each target operation request into the first target queue.

12. The cache management method as claimed in claim 11, wherein determining whether the target hash value collides with the hash value of the operation request in the third target queue comprises:
if the target hash value is the same as the hash value of the operation request in the third target queue, determining that the target hash value collides with the hash value of the operation request in the third target queue; and
if the target hash value is different from the hash value of the operation request in the third target queue, determining that the target hash value does not collide with the hash value of the operation request in the third target queue.

13. The cache management method as claimed in claim 2, wherein the target hash value comprises a row, a signature and a CAM val.

14. The cache management method as claimed in claim 1, wherein each target operation request is any one of the following requests: an allocation request, a release request, a check request, a lock request, an unlock request, and a set request.

15. The cache management method as claimed in claim 1, wherein receiving the plurality of target operation requests sent by the target user comprises:
    receiving the plurality of target operation requests sent by the hardware cache user or the plurality of target operation requests sent by the software cache user by means of the software cache manager.

16. The cache management method as claimed in claim 15, wherein feeding back the processing result of each target operation request to the target user, and executing the cache maintenance operation corresponding to the processing result according to the processing result by means of the software cache manager comprise:
    if one target operation request is a request sent by the hardware cache user, sending response information of the target operation request to the hardware cache user, and generating event information corresponding to the response information and sending same to the software cache manager, such that the software cache manager executes a cache maintenance operation corresponding to the event information according to the event information; and
    if one target operation request is a request sent by the software cache user, sending response information of the target operation request to the software cache user, such that the software cache manager executes a cache maintenance operation corresponding to the response information according to the response information.

17. The cache management method as claimed in claim 16, wherein generating the event information corresponding to the response information and sending same to the software cache manager comprise:
    asynchronously notifying the software cache manager of the event information by means of event reporting, wherein the event information comprises information about cache allocation behaviors, usage behaviors and query behaviors.

18. A cache management system, comprising:
    a storage system cache manager, configured to receive a plurality of target operation requests sent by a target user, process the plurality of target operation requests in a pipeline manner, so as to execute a processing operation corresponding to each target operation request on a cache line using the target operation request, and feed back a processing result of each target operation request to the target user, wherein the target user comprises a software cache user or a hardware cache user; and
    a software cache manager, configured to based on the processing result, execute a cache maintenance operation corresponding to the processing result.

19. An electronic device, comprising:
    a memory, configured to store a computer program; and
    a processor, configured to implement steps of the cache management method as claimed in claim 1 when executing the computer program.

20. A computer non-transitory computer readable storage medium, wherein the non-transitory computer readable storage medium stores a computer program which, when executed by a processor, causes the processor to:
    receive a plurality of target operation requests sent by a target user, wherein the target user comprises a software cache user or a hardware cache user;
    process the plurality of target operation requests in a pipeline manner, so as to execute a processing operation corresponding to each target operation request on a cache line using the target operation request; and
    feed back a processing result of each target operation request to the target user, and based on the processing result, execute a cache maintenance operation corresponding to the processing result by means of a software cache manager.

* * * * *